United States Patent
Amico et al.

(10) Patent No.: US 10,152,641 B2
(45) Date of Patent: Dec. 11, 2018

(54) ARTIFICIAL INTELLIGENCE BASED VEHICLE DASHBOARD ANALYSIS

(71) Applicant: Jack Cooper Logistics, LLC, Kennesaw, GA (US)

(72) Inventors: Andrea Amico, Marietta, GA (US); Mohit Prabhushankar, Atlanta, GA (US)

(73) Assignee: Jack Cooper Logistics, LLC, Kennesaw, GA (US)

( * ) Notice: Subject to any disclaimer, the term of this patent is extended or adjusted under 35 U.S.C. 154(b) by 170 days.

(21) Appl. No.: 15/411,543

(22) Filed: Jan. 20, 2017

(65) Prior Publication Data

US 2018/0211122 A1  Jul. 26, 2018

(51) Int. Cl.
| | |
|---|---|
| *G06K 9/00* | (2006.01) |
| *B60K 37/00* | (2006.01) |
| *G07C 5/08* | (2006.01) |
| *G07C 5/00* | (2006.01) |
| *G06T 7/10* | (2017.01) |
| *G06K 9/66* | (2006.01) |
| *G06T 7/70* | (2017.01) |
| *G06K 9/62* | (2006.01) |

(52) U.S. Cl.
CPC .......... *G06K 9/00832* (2013.01); *B60K 37/00* (2013.01); *G06K 9/6267* (2013.01); *G06K 9/66* (2013.01); *G06T 7/10* (2017.01); *G06T 7/70* (2017.01); *G07C 5/004* (2013.01); *G07C 5/0825* (2013.01)

(58) Field of Classification Search
CPC .. B60K 37/00; G06K 9/00832; G06K 9/6267; G06K 9/66; G06T 7/10; G06T 7/70; G07C 5/004; G07C 5/0825
See application file for complete search history.

(56) References Cited

U.S. PATENT DOCUMENTS

| 4,625,329 A * | 11/1986 | Ishikawa | ............ B60R 1/07 180/271 |
| 5,531,472 A * | 7/1996 | Semchena | ............ G07C 5/0891 280/735 |
| 6,766,036 B1 * | 7/2004 | Pryor | ............ A63F 13/06 348/169 |

(Continued)

FOREIGN PATENT DOCUMENTS

WO    WO 2015/124939    8/2015

*Primary Examiner* — Peter D Le
(74) *Attorney, Agent, or Firm* — King & Spalding

(57) ABSTRACT

A portable computing device equipped with an image capture device captures an image of a vehicle dashboard of a vehicle. Then, the portable computing device identifies the location of one or more components of the vehicle dashboard in the captured image. Based on the location of the one or more components, the portable computing device segments the captured image to obtain an image of each of the one or more components. Further, the portable computing device processes the images of the one or more components using one or more machine learning models to determine a reading associated with each of the one or more components. An accuracy of the readings is verified and responsively, the portable computing device inputs the readings in respective data fields of an electronic form. The readings associated with the one or more components of the vehicle dashboard represent data associated with the vehicle.

17 Claims, 23 Drawing Sheets

(56) References Cited

U.S. PATENT DOCUMENTS

| | | | | |
|---|---|---|---|---|
| 6,845,177 B2* | 1/2005 | Chiu | | G01D 5/39 340/688 |
| 7,242,806 B2* | 7/2007 | Johnson | | G06K 9/00 348/160 |
| 7,551,783 B2 | 6/2009 | Johnson et al. | | |
| 8,319,665 B2* | 11/2012 | Weinmann | | G01C 23/00 340/438 |
| 8,831,813 B1* | 9/2014 | Ferguson | | B60T 7/042 701/23 |
| 8,912,883 B2* | 12/2014 | Kobres | | G06Q 30/06 340/5.2 |
| 9,046,390 B2* | 6/2015 | Lye | | H04Q 9/00 |
| 9,183,441 B2* | 11/2015 | Blumer | | G06K 9/00624 |
| 2005/0270178 A1* | 12/2005 | Ioli | | G06Q 20/40 340/932.2 |
| 2007/0236366 A1* | 10/2007 | Gur | | G06K 9/00 340/945 |
| 2008/0048879 A1* | 2/2008 | Lipman | | B60K 37/02 340/688 |
| 2008/0077451 A1* | 3/2008 | Anthony | | G06Q 10/10 705/4 |
| 2009/0183584 A1* | 7/2009 | Valoff | | G01D 4/008 73/866.3 |
| 2012/0206592 A1* | 8/2012 | Gerst, III | | G06K 7/10544 348/86 |
| 2013/0272570 A1* | 10/2013 | Sheng | | G06F 3/017 382/103 |
| 2014/0133706 A1* | 5/2014 | Conradt | | G06K 9/4604 382/104 |
| 2014/0257873 A1* | 9/2014 | Hayward | | G07C 5/00 705/4 |
| 2014/0347482 A1* | 11/2014 | Weinmann | | H04N 5/247 348/144 |
| 2015/0113012 A1* | 4/2015 | Silver | | H04L 51/38 709/206 |
| 2015/0352953 A1* | 12/2015 | Koravadi | | B60K 37/06 701/36 |
| 2016/0055386 A1 | 2/2016 | Blumer et al. | | |
| 2016/0093122 A1* | 3/2016 | Chen | | G07C 5/0808 701/29.6 |
| 2016/0098607 A1* | 4/2016 | Conradt | | G06K 9/4604 382/190 |
| 2016/0203386 A1* | 7/2016 | Porecki | | G06K 9/00677 382/159 |
| 2017/0154314 A1* | 6/2017 | Mones | | G06Q 10/1053 |
| 2017/0299873 A1* | 10/2017 | Hickerson | | G02B 26/101 |

* cited by examiner

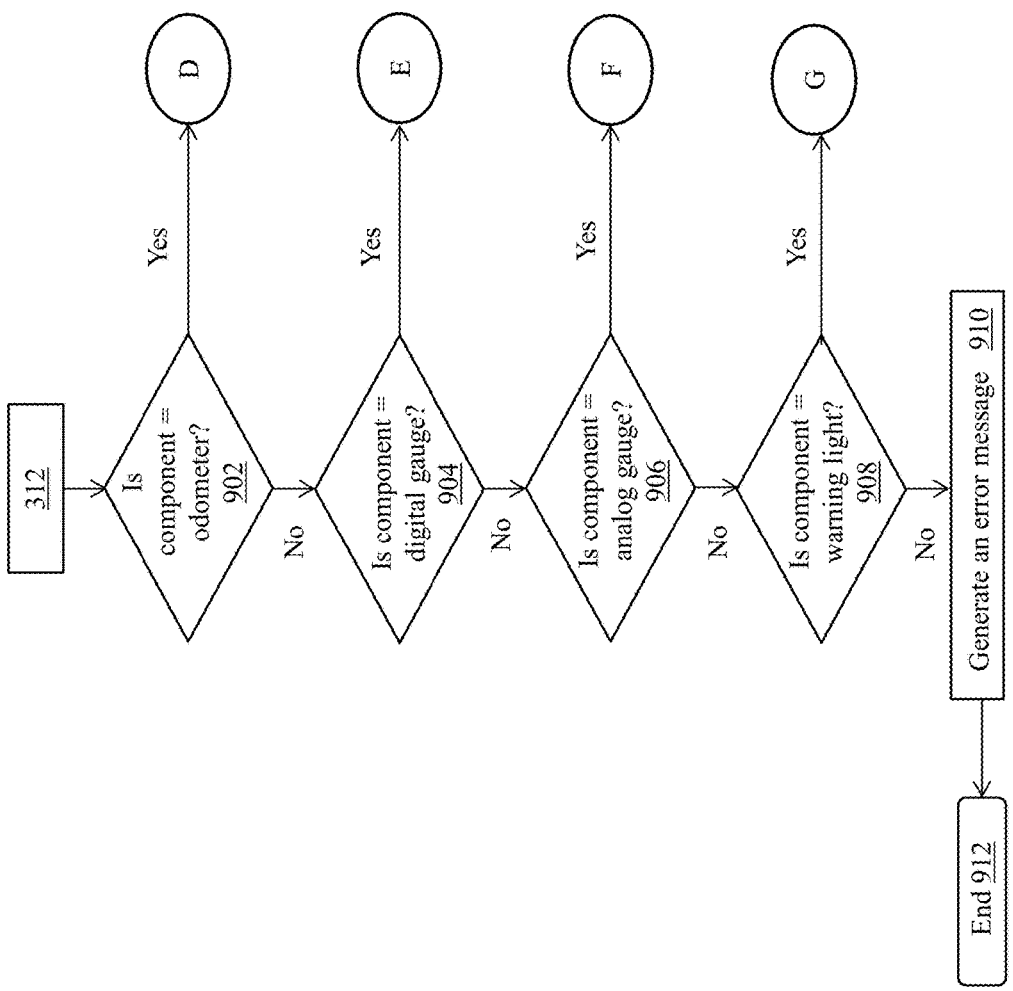

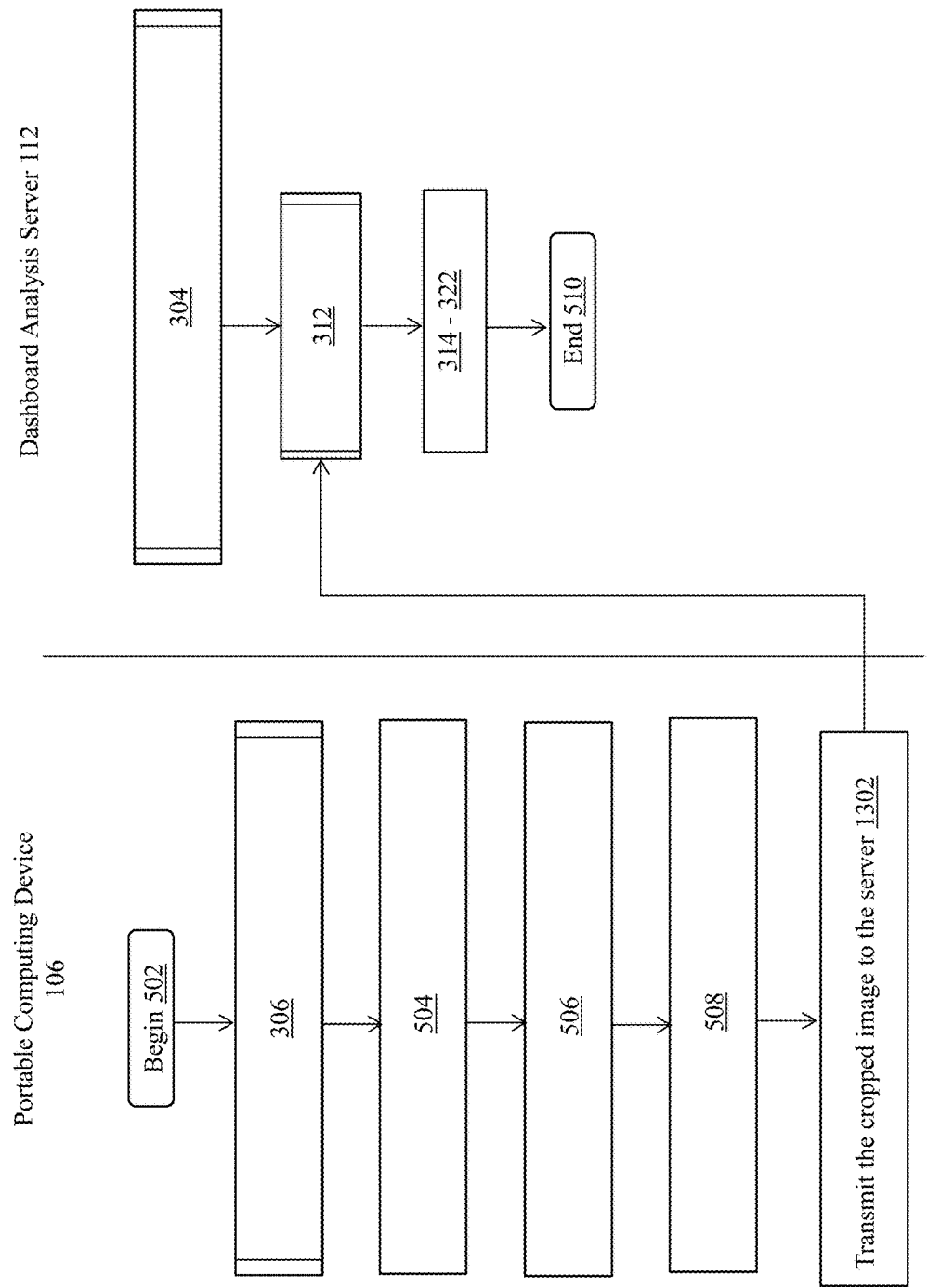

ARTIFICIAL INTELLIGENCE BASED VEHICLE DASHBOARD ANALYSIS

TECHNICAL FIELD

The present disclosure relates generally to computer vision, and in particular to a system, method, and apparatus for automated extraction of data associated with a vehicle from an image of the vehicle's dashboard using artificial intelligence technology.

BACKGROUND

Vehicle rental businesses, fleet management businesses, and/or vehicle leasing businesses may regularly register data associated with each vehicle owned by said businesses for effective management and operation of the said businesses. For example, the businesses may periodically register a location, a mileage, and/or a condition of a vehicle. Said data associated with vehicles may be also be beneficial to issuers of insurance policies, logistics providers, maintenance business, and other service providers, in addition to States and other agencies, vehicle history providers, and data aggregators.

Typically, to register said data associated with a vehicle, an employee of said businesses, a driver, or a service provider may go to each vehicle, retrieve the relevant data, and manually record the data on a paper form. Then, the data recorded on the paper form may be inputted to an electronic form on a computer. In other words, currently, the registration of data associated with vehicles is done manually and therefore, is inefficient, labor intensive, and prone to human error, particularly when a large number of vehicles are involved.

Automated technologies that move the process of registering data associated with vehicles away from a human user do exist. For example, vehicles are provided with on-board diagnostic ports (OBD) to which telematics devices can be coupled to extract information associated with the vehicles. However, the OBD port of each vehicle may have a proprietary design and therefore, different telematics device hardware may be required for different types of vehicles making said automated solution inefficient and cost-intensive. In another example, computer vision algorithms, such as optical character recognition (OCR) have been used to obtain a mileage of a vehicle from an image of the vehicle's odometer. However, OCR is limited to reading vehicle dashboard components whose values are represented by clearly defined numbers and/or texts. Therefore, OCR cannot be used to obtain data from vehicle dashboard components that are not defined by numbers or texts, such as analog gauges, digital gauges, warning lights, etc. In yet another example, customized or explicit algorithms may be used for analyzing specific components of a specific vehicle's dashboard. However, when numerous makes of vehicles are involved, where each make has numerous models and each model has different vehicle dashboard layout and configuration, designing and programming explicit algorithms for each vehicle becomes unfeasible, extremely inefficient, and cost-prohibitive.

In light of the above discussed deficiencies of existing technologies, there exists a need for an improved technology for automated extraction of data associated with a vehicle from an image of the vehicle's dashboard.

SUMMARY

The present disclosure describes a system, method, and/or apparatus that provides a technical solution rooted in computer technology—machine learning and feature extraction—to address one or more technical problems of conventional systems for automated vehicle dashboard analysis, such as the inability of standard computer vision algorithms (e.g., OCR) of conventional systems to obtain readings of all the components of a vehicle's dashboard, particularly, the digital odometers, the analog gauges, the digital gauges, and the warning lights on the vehicle's dashboard.

In one example aspect, the system, method, and apparatus described herein includes a portable computing device that is equipped with a camera to capture an image of a vehicle dashboard and feed it to a dashboard analysis engine of the portable computing device. Upon receiving the captured image of the vehicle dashboard, the dashboard analysis engine processes, using machine learning models, the captured image to identify each component of the vehicle dashboard and determine its location within the vehicle dashboard. In some examples, the location of each component within the vehicle dashboard may be determined based on a make and model of the vehicle which is either provided as a user input or obtained from a Vehicle Identification Number (VIN) of the vehicle.

The make and model of the vehicle may also be obtained wirelessly by the portable computing device from a make and model signal that may be broadcasted by the vehicle (e.g. by its in-car telematics, Bluetooth, third party device installed on board, etc.) or by reading a signal broadcasted by an external device that is aware of the make/model/year of that vehicle (e.g. by a device that can read the license plate, an RFID tag, a Bluetooth device connected with the in-car infotainment system, etc.). Alternatively, the make and model of the vehicle may be determined by comparing the captured vehicle dashboard image to an existing database of dashboard images of known vehicle makes/models/years.

In other examples, the location of each component within the vehicle dashboard may be provided as a user input. For example, the image of the vehicle's dashboard may be presented via a display of the portable computing device and the user may be prompted to touch and identify the location of each component of the vehicle's dashboard in the presented image. In another example, the location of each component within the vehicle dashboard may be determined by a machine learning algorithm by recognizing certain features of a given component and building on its accumulated experience with similar dashboards of other vehicles. In yet another example, the location of each component within the vehicle's dashboard in the presented image may be determined by using coordinate systems where the pixel coordinates of at least one component may be known and the location of the other components may be determined relative to the pixel coordinates of the known component.

Once the components and their locations are identified, the dashboard analysis engine obtains, using the machine learning models, a reading associated with each component from an image of the component that is separated (cropped) from the captured vehicle dashboard image. For example, once a component and its location within the image of the vehicle's dashboard is identified, the dashboard analysis engine may crop the image of the vehicle dashboard to obtain the image of component. Further, the cropped image of the component may be provided as input to a respective machine learning model that is configured to extract a reading associated with the component.

The readings associated with the components of the vehicle's dashboard may provide data associated with the vehicle. Example components of the vehicle's dashboard may include, but are not limited to, odometers, digital gauges, analog gauges, and/or warning lights.

To generate the machine learning models, a plurality of images from an image database, such as images of vehicle dashboards and images of one or more components of each vehicle dashboard for a plurality of makes and models of vehicles and for different readings of the one or more components are provided as an input to a machine learning algorithm as training data. Responsively, the machine learning algorithm may train one or more models and/or networks to: (a) identify the make and model of the vehicle from an image of a vehicle dashboard, (b) identify each component of the vehicle dashboard and its location within the vehicle dashboard from an image of a vehicle dashboard, and/or (c) obtain readings associated with the one or more components of the vehicle dashboard from an image of a vehicle's dashboard. In particular, once the training data is provided, the machine learning algorithm may find or learn a pattern in the training data that maps certain attributes of the input training data to a target (or label that is to be predicted), e.g., make and model of the vehicle, the location of one or more components within the vehicle dashboard, and/or readings associated with the one or more components of the vehicle's dashboard. Responsive to finding or learning the pattern, the machine learning algorithm generates one or more models and/or networks that capture said patterns. These models and/or networks are then used by the dashboard analysis engine to get predictions on new data, e.g., an image of the vehicle dashboard captured by the camera of the portable computing device, for which the make and model of the vehicle, the location of one or more components within the vehicle dashboard, and/or readings associated with the one or more components of the vehicle dashboard is unknown.

Example machine learning models may include a vehicle type model trained to identify the make and model of a vehicle from an image of the vehicle dashboard, a location model trained to identify each component of a vehicle dashboard and its location within the vehicle's dashboard from the image of the vehicle dashboard, an odometer model trained to obtain an odometer reading (mileage) from an image of an odometer component of the vehicle dashboard, a digital gauge model trained to obtain a digital gauge reading from an image of a digital gauge component of the vehicle dashboard, an analog gauge model trained to obtain an analog gauge reading from an image of a analog gauge component of the vehicle dashboard, and/or a warning light model trained to identify a condition of the vehicle represented by a warning light from an image of the warning light component of the vehicle dashboard. The example models listed above are not exhaustive. That is, other appropriate machine learning models configured to obtain any other appropriate data associated with the vehicle from an image of the vehicle dashboard are not outside the broader scope of the present disclosure.

In some examples, in addition to the machine learning models, other technologies such as Optical Character Recognition (OCR) may be used to obtain a reading associated with a component of the vehicle dashboard. For example, the machine learning model may determine that a certain vehicle has a mechanical odometer, and consequently the portable computing device may use an OCR optimized for mechanical odometers (printed digits) to obtain the reading (mileage) associated with the odometer.

Once the reading associated with each component of the vehicle's dashboard is obtained, the portable computing device either inputs the readings in an electronic form or transmits the readings to an external server for presentation or recordation. Further, a user may be provided an option to verify the readings and the result of verification may or may not be provided as feedback to the machine learning algorithm for additional training and optimization of the models. This information can also be used as labels for reinforcement learning algorithms to learn from users.

These and other aspects, features, and embodiments of the disclosure will become apparent to a person of ordinary skill in the art upon consideration of the following brief description of the figures and detailed description of illustrated embodiments.

BRIEF DESCRIPTION OF THE DRAWINGS

The foregoing and other features and aspects of the disclosure are best understood with reference to the following description of certain example embodiments, when read in conjunction with the accompanying drawings, wherein:

FIGS. 9A-9F (collectively 'FIG. 9') illustrate an example dashboard component reading operation of the dashboard analysis system using machine learning models, in accordance with example embodiments of the present disclosure;

FIG. 13 illustrates yet another example dashboard analysis operation of the dashboard analysis system illustrated in FIG. 1B, in accordance with example embodiments of the present disclosure.

Figure 1A:
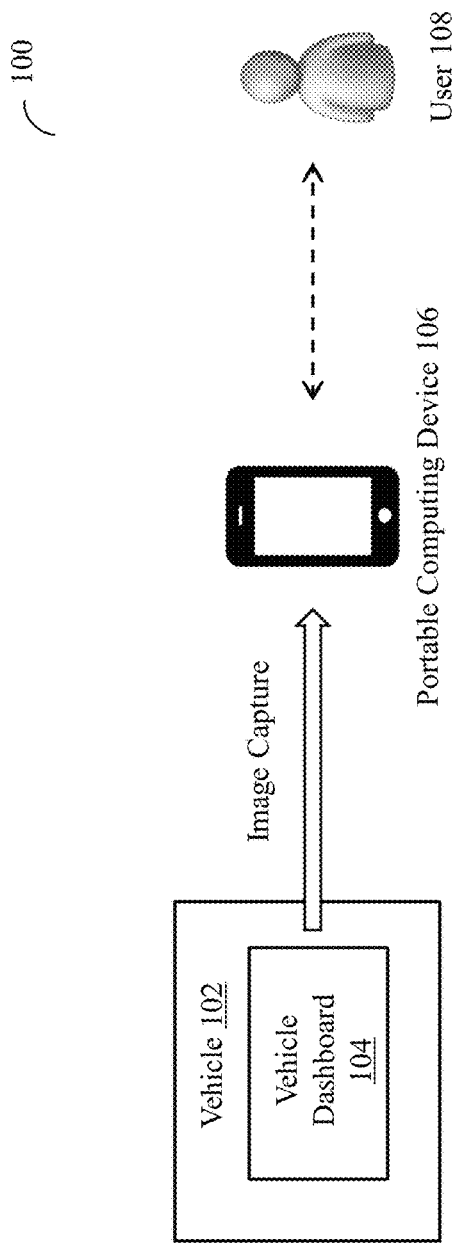
FIG. 1A illustrates an example operating environment of a dashboard analysis system, in accordance with example embodiments of the present disclosure.

The drawings illustrate only example embodiments of the disclosure and are therefore not to be considered limiting of its scope, as the disclosure may admit to other equally effective embodiments. The elements and features shown in the drawings are not necessarily to scale, emphasis instead being placed upon clearly illustrating the principles of the example embodiments. Additionally, certain dimensions or positioning may be exaggerated to help visually convey such principles.

DETAILED DESCRIPTION OF EXAMPLE EMBODIMENTS

In the following paragraphs, a system, method, and apparatus for obtaining data associated with a vehicle from an image of the vehicle's dashboard using artificial intelligence will be described in further detail by way of examples with reference to the attached drawings. In the description, well known components, methods, and/or processing techniques are omitted or are briefly described so as not to obscure the disclosure. As used herein, the "present disclosure" refers to any one of the embodiments of the disclosure described herein and any equivalents. Furthermore, reference to various feature(s) of the "present disclosure" is not to suggest that all embodiments must include the referenced feature(s).

The system, method, and apparatus of the present disclosure is directed towards obtaining data associated with a vehicle by capturing an image of the vehicle's dashboard using a camera of a portable computing device and processing the image using machine learning models to obtain readings associated with one or more components of the vehicle dashboard.

The machine learning models may be generated by a machine learning algorithm as an initial set-up process before capturing the image of the vehicle dashboard. During the initial set-up, the machine learning algorithm may train the machine learning models to identify the make and model of the vehicle, the location of each component within the vehicle dashboard, and obtain readings associated with each component of the vehicle dashboard. Responsive to generating the machine learning models and receiving the image of the vehicle dashboard that is captured by the camera, the portable computing device may identify a make and a model of the vehicle using an appropriate machine learning model or based on a user input. Responsively, the portable computing device may estimate a location of each component of the vehicle dashboard in the captured image based on the make and model of the vehicle. In some example embodiments, the location of each component of the vehicle dashboard in the image may be obtained through user input. In another example, the location of each component within the vehicle dashboard may be determined by a machine learning algorithm by recognizing certain features of a given component and building on its accumulated experience with similar dashboards of other vehicles. In either case, once the location of each component is obtained, the portable computing device segments (crops) the image of each component of the vehicle's dashboard from the captured image based on the location of each component in the captured image. The cropped image of each component is inputted to a respective machine learning model that is trained to obtain the reading of the component. Responsive to receiving the cropped images, the machine learning models may output the reading associated with the components of the vehicle dashboard. The readings associated with the components of the vehicle dashboard may provide data associated with the vehicle.

The portable computing device may record the readings associated with the components in an electronic form or transmit the readings for presentation and recordation. Additionally, the portable computing device may provide an option to a user to verify the readings of the components obtained by the machine learning models. The results of the verification may or may not be provided as feedback to the machine learning algorithm for further training and minimizing the machine learning models. If the results of the verification are sent as feedback, then reinforcement learning and stochastic methods can be used to modify the models to better suit the applications.

The system, method, and apparatus for artificial intelligence based vehicle dashboard analysis will be further described in greater detail below. However, before discussing the example embodiment directed to the system, method, and apparatus for artificial intelligence based vehicle dashboard analysis, it may assist the reader to understand the various terms used herein by way of a general description of the terms in the following paragraphs.

The term 'dashboard,' as used herein may generally refer to any appropriate panel of an automobile that houses instrumentation configured to display data associated with a vehicle. The term dashboard may be interchangeably referred to as instrument panel, fascia, or dash without departing from a broader scope of the present disclosure. In one example, the dashboard may be placed in front of the driver and may house instrumentation such as odometer, fuel gauge, warning lights, etc. The instrumentation may provide data associated with the vehicle, such as mileage, fuel level, oil pressure, temperature of the engine coolant, etc. The above disclosed instrumentation and data provided by the instrumentation are only examples and are not exhaustive. That is, in other examples, the dashboard may have any other type and number of instruments in addition to or in lieu of the above-mentioned instrumentation to provide data associated with a vehicle. For example, the dashboard may include a speedometer, tachometer, turn signal indicator, gear shift position indicator, etc. Further, in other example embodiments, the dashboard may be placed at any other appropriate position within the vehicle such that it can be seen by the driver of the vehicle.

The term 'component,' as used herein may generally refer to any appropriate instrumentation in the dashboard of the vehicle that is configured to provide data associated with the vehicle. The instrumentation may be mechanical and/or digital instrumentation. For example, the instrumentation may include, but is not limited to, digital or mechanical odometer displays, analog or digital fuel gauges, seat belt warning light, parking brake engagement warning light, engine malfunction warning light, tire pressure warning lights, etc.

The term 'portable computing device,' as used herein can include any appropriate hand held computing device, such as, but not limited to, a cell phone, a smartphone, a personal digital assistant, a tablet, a phablet, etc. In certain example embodiments, the portable computing device is equipped with a camera and/or a flash for capturing an image. In yet another example embodiment, the portable computing device can be an independent image capture device, such as, a camera or video recorder with a processor to process and analyze the image, a memory, and/or a transceiver for wired or wireless transmission of data.

The term 'machine learning' as used herein generally refers to a type of artificial intelligence (AI) that provides computers with the ability to learn without being explicitly programmed. Machine learning focuses on the development of computer programs that can teach themselves to grow and change when exposed to new data.

Technology associated with the system, apparatus, and method for artificial intelligence based vehicle dashboard analysis will now be described in greater detail with reference to FIGS. 1-13. In particular, first, FIGS. 1A and 1B (collectively 'FIG. 1') will be discussed in the context of describing representative operating environments associated with the system, method, and apparatus for dashboard analysis, according to certain exemplary embodiments of the present invention. Further, FIGS. 2-13 will be discussed, making exemplary reference back to FIG. 1 as may be appropriate or helpful.

It will be appreciated that the various embodiments discussed herein need not necessarily belong to the same group of exemplary embodiments, and may be grouped into various other embodiments not explicitly disclosed herein. In the following description, for purposes of explanation, numerous specific details are set forth in order to provide a thorough understanding of the various embodiments.

Turning to FIG. 1A, this figure illustrates an example operating environment of a dashboard analysis system, in accordance with example embodiments of the present disclosure. In particular, a system 100 includes a vehicle 102 and a portable computing device 106 equipped with an image capture device (e.g., camera 202) (shown in FIGS. 2A and 2B). The portable computing device 106 may be associated with a user 108 and the user 108 may interact with the portable computing device 106 (via a user interface 212 (shown in FIGS. 2A and 2B)) to capture an image of a dashboard 104 of the vehicle 102.

In particular, the portable computing device 106 may provide visual or graphical cues to a user 108 to guide the user 108 on how to capture the image of the vehicle dashboard 104 according to certain specifications, such as a distance from which to capture the image such that the image captures the entire dashboard with minimal occlusions. The interaction of the user 108 with the portable computing device 106 may include visual interaction, such as, gestures; auditory interaction, such as, voice commands; and/or tactile interaction, such as, touching an appropriate surface of the portable computing device, pressing a key on a keypad of the portable computing device, etc.

Responsive to capturing the image of the vehicle dashboard 104, the portable computing device 108 may be configured to process, using machine learning models, the captured image to obtain and output readings associated with one or more components of the vehicle's dashboard 104. As described above, the readings may represent data associated with the vehicle 102. Further, as described above, the models and/or networks may be generated by a machine learning algorithm as an initial set-up prior to receiving the captured image of the vehicle dashboard 104.

Once the readings of the one or more vehicle dashboard components are obtained from the captured image of the vehicle dashboard 104, the portable computing device may be configured to present the readings to the user 108 via a display 210 (shown in FIGS. 2A and 2B) of the portable computing device 106. Further, the portable computing device 106 may provide an option to the user 108 to verify the readings. If the reading outputted by the portable computing device 106 is different from that displayed in the captured image of the vehicle dashboard 104, then, the captured image may be marked as an exception. Further, the captured image marked as exception may either be stored in a database for future reference or provided as feedback to further train and optimize the models and/or networks. However, if the reading outputted by the portable computing device 106 substantially matches the reading displayed by the corresponding component in the captured image of the vehicle dashboard 104, then, the portable computing device 106 may be configured to input the readings into an electronic form. For example, a mileage of a vehicle may be inputted in a mileage data field in the electronic form, a fuel level of the vehicle may be inputted in a fuel level data field in the electronic form, and so on. In some embodiments, if the reading outputted by the portable computing device 106 substantially matches the reading displayed by the corresponding component in the captured image of the vehicle's dashboard, said result may also be provided as feedback to optimize the models and/or networks.

In some embodiments, the readings outputted by the portable computing device 106 may be verified after they have been inputted in the electronic form. Alternatively, in other example embodiments, the portable computing device 106 may transmit the readings of the one or more vehicle dashboard components to a remote server for presentation and/or recordation.

Figure 1B:
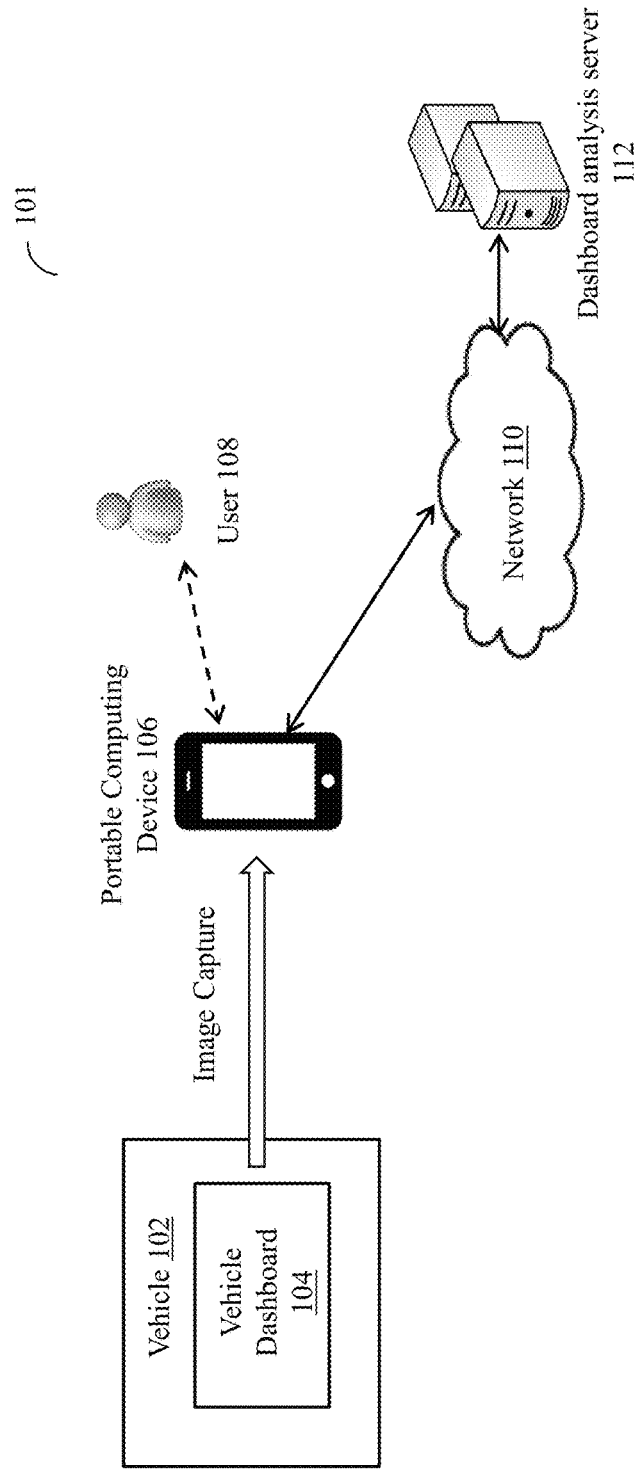
FIG. 1B illustrates another example operating environment of a dashboard analysis system, in accordance with example embodiments of the present disclosure.

Even though FIG. 1A describes that the portable computing device 106 is configured to obtain the readings associated with the one or more components of the vehicle dashboard 104, in some example embodiments, e.g., as illustrated in FIG. 1B, the process of obtaining the readings of one or more components of the vehicle dashboard may be performed external to the portable computing device 106.

Turning to FIG. 1B, this figure illustrates another example operating environment of a dashboard analysis system, in accordance with example embodiments of the present disclosure. It is noted that FIG. 1B is substantially similar to FIG. 1A, except that one or more operations of obtaining data associated with a vehicle 102 from an image of the vehicle dashboard 104 may be performed in a dashboard analysis server 112 that is external to and communicably coupled to the portable computing device 106 via a wired and/or a wireless network 110. In the example embodiment illustrated in FIG. 1B, the user 108 may interact with the portable computing device 106 to capture the image of vehicle dashboard 104. However, instead of processing the captured image at the portable computing device 106, in the example embodiment of FIG. 1B, the portable computing device 106 may transmit the captured image to the dashboard analysis server 112 (herein 'server 112') via the wired and/or wireless network 110. In certain example embodiments, the captured image may be transmitted to the server 112 as and when the images are captured by the portable computing device 106. Alternatively, in other example embodiments, the captured image may be transmitted to the server 112 after a predetermined time interval or after a predetermined number of images of other vehicle dashboards have been captured, e.g., as batch data. In either case, responsive to receiving the captured image, the server 112 may process, using machine learning models, the image to obtain readings associated with one or more components of the vehicle dashboard 104. In the example embodiment of FIG. 1B, the machine learning models may be generated at the server 112 prior to receiving the captured image of the vehicle's dashboard 104. Further, the machine learning models and the machine learning algorithm that generates the machine learning models may be stored in the server 112.

Once the server 112 processes the captured image to obtain readings associated with one or more components of the vehicle's dashboard 104, the server 112 may transmit the readings back to the portable computing device 106 for presentation to the user 108 via the display 210 of the portable computing device 106. Then, the portable computing device 106 may provide an option to the user 108 to verify the readings. The result of the verification may or may not be sent as feedback to the server 112 to further train and optimize the machine learning models. Additionally, as described above in association with FIG. 1A, the portable computing device 106 may input the readings to an electronic form.

In some example embodiments, the server 112 may transmit a message to the portable computing device 106 that informs the user 108 that the captured image has been processed and readings associated with one or more components of the vehicle dashboard have been obtained. The message may include a web link that the user 108 can select via the user interface 212 of the portable computing device 106. The web link may provide the user 108 access to the readings stored in the server 112 or inputted in the electronic form.

In the example embodiment illustrated in FIG. 1B, a client instance of the server 112 may be downloaded on the portable computing device 106 to guide a user to capture the image of the vehicle dashboard. Further, the client instance may also provide the user 108 an access to the server 112 via the portable computing device 106. The portable computing device 106 and the server 112 will be further described below in greater detail in association with FIGS. 2A and 2B.

Figure 2A:
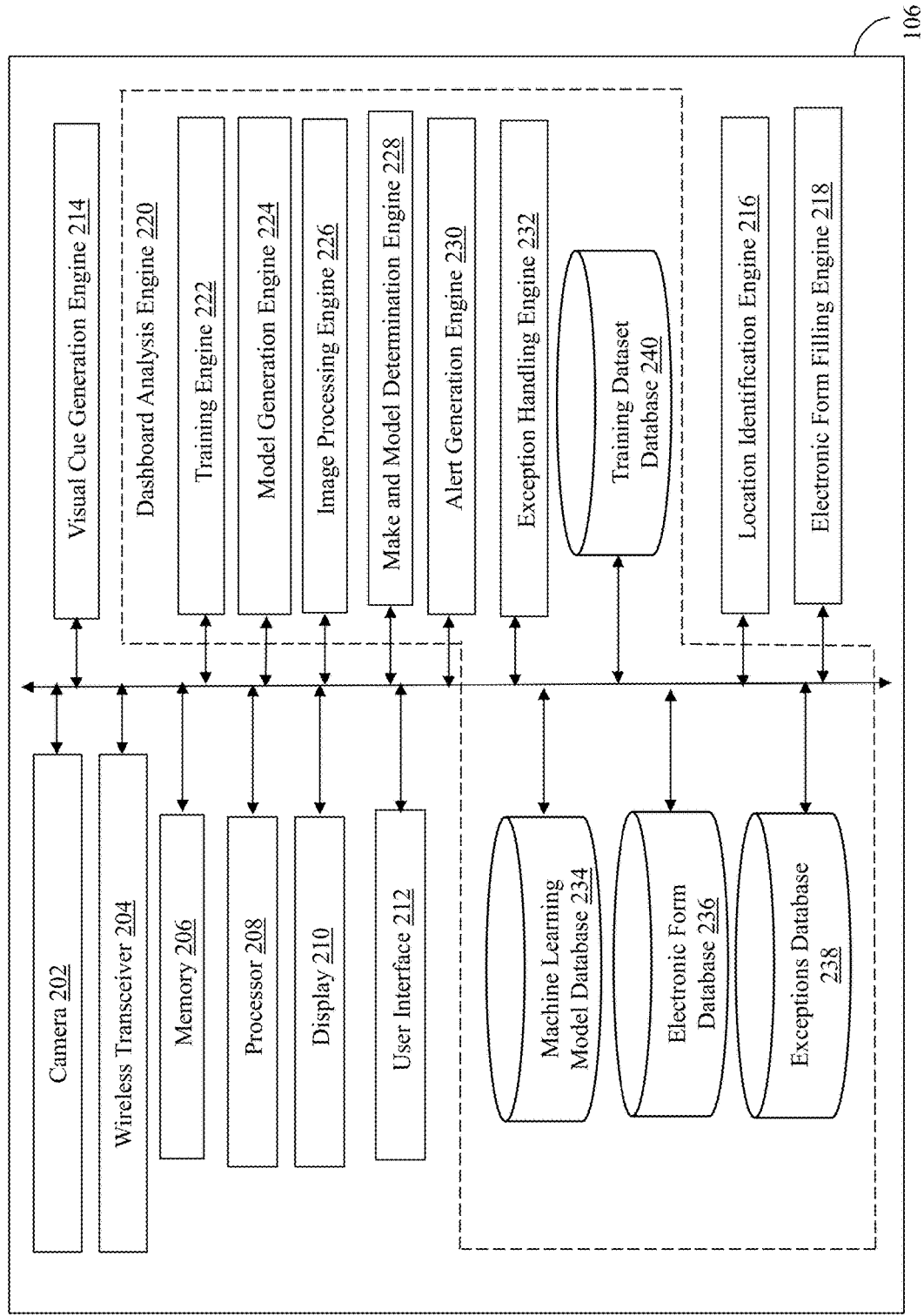
FIG. 2A illustrates a block diagram of the portable computing device of FIG. 1A comprising a dashboard analysis engine, in accordance with example embodiments of the present disclosure.

Turning to FIG. 2A, this figure illustrates a block diagram of the portable computing device of FIG. 1A comprising a dashboard analysis engine, in accordance with example embodiments of the present disclosure. In particular, the portable computing device 106 includes a camera 202, a wireless transceiver 204, a memory 206, a processor 208, a display 210, a user interface 212, a visual cue generation engine 214, a location identification engine 216, an electronic form filling engine 218, and a dashboard analysis engine 220.

The processor 208 of the portable computing device 106 may be a multi-core processor or a combination of multiple single core processors. Further, the portable computing device 106 may include a memory 206 that is coupled to the processor 208. The memory 206 may be non-transitory storage medium, in one embodiment, and a transitory storage medium in another embodiment. The memory 206 may include instructions that may be executed by the processor 208 to perform operations of the portable computing device 106, e.g., generating machine learning models, capturing an image, obtaining reading of one or more components of the vehicle dashboard 104 from the image, etc. In other words, operations associated with the different engines 214-232, the camera 202, the wireless transceiver 204, the display 210, and the user interface 212 of the portable computing device 106 may be executed using the processor 208.

The wireless transceiver 206 of the portable computing device 106 may be configured to enable communication to and from the portable computing device 106. Further, as described above, the user interface 212 may be configured to receive a user input from a user 108 through a visual interaction, a auditory interaction, and/or a tactile interaction. Accordingly, the user interface 212 may include, but is not limited to, a touchscreen, a keypad, a microphone, a motion capture device, the camera 202, etc. In certain example embodiments, the display 210 and/or the camera 202 of the portable computing device 106 may operate as a user interface 212. For example, the display 210 may be a touchscreen display that the user 108 can interact with to capture an image, to zoom in/zoom out a captured image, and/or for other interactive operations. The display 210 of the portable computing device 106 may also be configured to visually present: an image as seen by the camera 202 (image feed), readings associated with one or more components of a vehicle's dashboard, electronic forms, etc.

The dashboard analysis engine 220 may be configured to generate one or more machine learning models that are trained to identify a make and model of a vehicle, the components of the vehicle's dashboard, the location of the components of the vehicle's dashboard, and/or readings associated with one or more components of the vehicle's dashboard from an image of the vehicle's dashboard. The machine learning models may be generated as an initial set-up, i.e., prior to capturing and processing an image of the vehicle dashboard 104.

To generate the one or more machine learning models, a plurality of training images stored in the training dataset database 240 of the dashboard analysis engine 220, e.g., images of vehicle dashboards and images of one or more components of vehicle dashboards for different makes and models of vehicles and different readings associated with the components, may be inputted to a machine learning algorithm of the training engine 222. Responsive to receiving the plurality of training images, the machine learning algorithm of the training engine 222 may operate in concert with the model generation engine 224 to train and generate one or more machine learning models which are then stored in the machine learning model database 234. Different training methods such as supervised, unsupervised, or semi-supervised training may be used to train the one or more machine learning models.

For example, to train a vehicle type model (a machine learning model) to identify a make and a model of a vehicle from an image of the vehicle's dashboard, the machine learning algorithm may be provided with hundred labelled images of vehicle dashboards of different makes and models of vehicles. The labels identify the make and model of the vehicle in each image. Similarly, the machine learning algorithm of the training engine 222 may train a location model to identify each component of a vehicle dashboard and its location within the vehicle dashboard from the image of the vehicle dashboard, an odometer model to obtain an odometer reading (mileage) from an image of an odometer component of the vehicle dashboard, a digital gauge model to obtain a digital gauge reading from an image of a digital gauge component of the vehicle dashboard, an analog gauge model trained to obtain an analog gauge reading from an image of an analog gauge component of the vehicle dashboard, and/or a warning light model trained to identify a condition of the vehicle represented by a warning light from an image of the warning light component of the vehicle dashboard.

In one or more example embodiments, the training dataset database 240 may be updated periodically to add images associated with dashboards of newer makes and models of vehicles. The data from the updated training dataset database 240 may then be used by the machine learning algorithm to update and train the machine learning models to account for the newer makes and models of vehicles. Further, even though FIG. 2A illustrates the training dataset database 240 as being configured in the portable computing device 106, one of ordinary skill in the art can understand and appreciate that in other example embodiments, the training dataset database 240 may be disposed external to the portable computing device 106.

To obtain the data associated with a vehicle 102 from an image of the vehicle's dashboard 104, a user 108 may activate the camera 202 via the user interface 212. The camera 202 of the portable computing device 106 may be configured to capture an image of the vehicle's dashboard 104. In some example embodiments, more than one image of the vehicle's dashboard 104 may be captured and superimposed to generate a high resolution image of the vehicle's dashboard 104. Further, even though FIGS. 2A (and 2B) illustrates one camera 202, one of ordinary skill in the art can understand and appreciate that in other example embodiments, the portable computing device 106 can include more than one camera, each of which may capture an image of the vehicle's dashboard without departing from a broader scope of the present disclosure. For example, the portable computing device 106 may have two cameras that mimic a left eye and right eye effect.

Once the camera 202 is activated, the user 108 may point the camera 202 of the portable computing device 106 towards the vehicle dashboard 104. Responsively, the processor 208 of the portable computing device 106 may render an image feed of the camera 202 on the display 210 of the portable computing device 106, thereby allowing the user 108 to see the input received by the camera 202. Since the camera 202 is pointed towards the vehicle dashboard 104, the image feed of the camera 202 that is rendered on the display 210 may be an image of the vehicle dashboard 104. The image feed of the camera 202 that is rendered on the display 210 may be pre-processed by the processor 208 of the portable computing device 106 to compensate/account for the characteristics of the camera, the variable lighting conditions, etc.

In addition to rendering the image feed of the camera 202 on the display 210, the camera 202 may interact with the visual cue generation engine 214 to generate one or more graphical cues to assist/guide a user 108 on how to position the camera 202 to capture an image of the vehicle's dashboard 104 such that the entire dashboard 104 of the vehicle 102 is captured in the image without occlusions or with minimal occlusions. The visual cue generation engine 214 may create and overlay one or more graphical cues on the image feed that is rendered on the display 210. The one or more graphical cues as described herein may include, but are not limited to, cross-hairs, boxes, arrows, texts, etc. Even though the present disclosure describes visual cues being used to guide a user 108 to capture an image, one of ordinary skill in the art can understand and appreciate that in other example embodiments, other type of cues, such as, auditory or tactile cues may be provided without departing from a broader scope of the present disclosure.

Once the camera 202 position is finalized, the user 108 may interact with the user interface 212 to capture an image of the vehicle's dashboard 104 using the camera 202. Once the image of the vehicle dashboard 104 is captured, the camera 202 may transmit the image to the image processing engine 226 (a sub component of the dashboard analysis engine 220). Responsive to receiving the image of the vehicle dashboard 104, the image processing engine 226 may interact with the make and model determination engine 228 to identify the make and model of the vehicle 102. In one example embodiment, the make and model determination engine 228 may input the image of the vehicle's dashboard 104 to the vehicle type model stored in the machine learning model database 234 to identify the make and/or model of the vehicle 102. In said example embodiment, the make and model of the vehicle 102 identified by the vehicle type model may be presented to a user 108 via the display 210 to confirm the make and model of the vehicle 102. Responsive to a negative confirmation, a feedback may be provided to the vehicle type model. In another example, the make and model determination engine 228 may communicate with the user interface 212 and the display 210 to generate and present a request to the user 108 to input the make and model of the vehicle 102 by typing, using pull down menus, etc. In yet another example embodiment, the make the make and model determination engine 228 may communicate with the user interface 212 and the display 210 to request the user 108 to input a vehicle identification number (VIN) of the vehicle 102. The user 108 may either input the VIN number or input an image of a VIN plate of the vehicle 102. In either case, the make and model determination engine 228 may resolve the VIN number to identify the make and model of the vehicle 102.

In other words, example methods that can be used to identify the make and model of the vehicle may include, but are not limited to:

(a) Direct user input method where the user enters by typing or selecting from pulldown menus with real options, the make, model, and year of the vehicle;

(b) Indirect user input method where the user enters a unique identifier of a vehicle, such as the VIN, the plate number, the registration number, a company specific code, etc. The make and model of the vehicle may be identified using the unique identifier. The unique identifier of the vehicle can be captured by leveraging the video capture/scanning abilities of the portable computing device with embedded cameras. For example, a barcode scanner of the phone may be used to scan the unique identifier, or an image of the vehicle plate with the unique identifier can be captured and processed by applying OCR on the unique identifier to identify the make and model of the vehicle, etc.;

(c) Wireless data signal method where the make and model of the vehicle is received by the portable computing device (or sent directly to a server) by either reading a signal broadcasted by the car, e.g., by its in-car telematics, Bluetooth, third party device installed on board, etc., or by reading a signal broadcasted by an external device that is aware of the make/model/year of the vehicle, e.g. by a device that can read the license plate, an RFID tag, a Bluetooth device connected with the in-car infotainment system, etc.;

(d) Dashboard picture comparison method where an image of the dashboard that is captured by the portable computing device is compared to an existing (and periodically updated) database of dashboards of known vehicle make/model/years to identify the make and model of the vehicle associated with the vehicle dashboard in the captured image; and (e) Machine learning model method where the captured image of the vehicle dashboard is processed using a vehicle type model that is trained to identify the make and model of the vehicle from the image of the vehicle's dashboard.

Once the make and model of the vehicle is determined, the image processing engine 226 may communicate the make and model of the vehicle 102 with an external database via the wireless transceiver 204 to determine an approximate location of each component of the vehicle dashboard 104 for the specific make and model of the vehicle 102. In some example embodiments, said information regarding the location of one or more components of the vehicle's dashboard may be stored in one of the databases 234-240 of the dashboard analysis engine 220. In another example embodiment, instead of determining the location of one or more components of the vehicle dashboard 104 based on the make and model of the vehicle 102, the image processing engine 226 may communicate with the user interface 212 and the display 210 to generate a query requesting the user to input the location of the one or more components of the vehicle's dashboard 104. For example, the query may present the image of the vehicle's dashboard 104 and request the user 108 to identify the location of the odometer by touching a portion of the display screen 210 that corresponds to the location of the odometer within the presented image of the vehicle's dashboard. Similarly, the locations of other components of the vehicle's dashboard 104 may be identified by input provided by the user 108. In yet another example embodiment, the image processing engine 226 may skip the step of identifying the make and model of the vehicle 102 using user input and directly input the image of the vehicle dashboard 104 to the location model stored in the machine learning model database 234 that is trained to identify one or more components of the vehicle's dashboard and an approximate location of the one or more components of the vehicle dashboard within the image of the vehicle dashboard 104.

In other words, example methods that can be used to determine the approximate location of various components of the vehicle dashboard may include, but are not limited to:

(a) Direct user input method where the user touches/highlights/selects the area of the captured vehicle dashboard image that contains the odometer, the fuel gauge, etc.;

(b) Relative coordinates to known features method which includes at least the following steps:
   (i) Learn the pixel coordinates of a known feature. This can be done either by direct input where the user indicates where a component, such as the odometer, is located in the vehicle dashboard image, or by analyzing the picture of the dashboard, e.g., identifying borders and/or salient features. The pixel coordinates of the identified vehicle dashboard component is assigned as the center of the coordinate system,
   (ii) Determine relative scale and offset (positioning) by comparing the picture of the dashboard with a reference picture, and
   (iii) Find the location of other components of the vehicle dashboard by applying relative coordinates, e.g., the fuel gauge is about 150 pixels to the right and 300 pixels down relative to the odometer.

(c) Machine learning approach method where machine learning models look for certain features associated with each component in the captured vehicle dashboard image to determine the location of the component. For example, the odometer often includes one or more of the following strings: "ODO", "mi", "km", and is likely the longest string of numbers in the dashboard (definitively true for used vehicles); the fuel gauge typically includes two or more of the following strings "E", "½", "F", the fuel pump icon, and a level indicator (e.g. a needle); warning lights are frequently red, orange, yellow, or green, have certain geometrical shapes, and may be accompanied by additional messages in the vehicle display (e.g. "maintenance required", "fuel level low"), which are likely the longest strings of text on the dashboard picture. The computer may analyze different sections of the captured image and score each area to determine the most likely pixel coordinates of the odometer, fuel gauge, and warning lights.

In either case, using the location of the one or more components of the vehicle dashboard 104 within the image, the image processing engine 226 may segment or crop out portions of the vehicle dashboard image to obtain separate images of each of the one or more components. Further, the image processing engine 226 may input the cropped image of each component to a respective machine learning model that is trained to obtain a reading associated with the component. For example, the cropped image of the odometer may be inputted to the odometer model stored in the machine learning model database 234, the cropped image of a digital gauge may be inputted to the digital gauge model stored in the machine learning model database 234, the cropped image of the analog gauge may be inputted to the analog gauge model stored in the machine learning model database 234, and the cropped image of the warning lights may be inputted to the warning light model stored in the machine learning model database 234.

Prior to inputting the cropped image of the odometer to the odometer model, the image processing engine 226 may be configured to determine whether the odometer displayed in the cropped image is digital odometer or a mechanical odometer based on the make and model of the vehicle 102. Responsive to determining that the odometer displayed in the cropped image is a mechanical odometer, the image processing engine 226 may be configured to determine if a unit of the reading (mileage) associated with the mechanical odometer in the cropped image can be identified/resolved from the cropped image. If the unit of the reading cannot be identified/resolved from the cropped image of mechanical odometer, in one example embodiment, the image processing engine 226 may be configured to obtain the unit of the reading based on the make and model of the vehicle 102. In another example embodiment, the image processing engine 226 may identify the unit of the reading based on a location associated with the image of vehicle dashboard 104 which is stored in a location metadata that is attached to the image by the location identification engine 216, such as a GPS module of the portable computing device 106 at the time of capturing the image. For example, if the location associated with the image of the vehicle dashboard is London, then the portable computing device 106 determines that the unit of the reading associated with the odometer is kilometers. However, if the location is New York, then the portable computing device 106 determines that the unit of the reading associated with the odometer is miles.

In either case, once the unit associated with the reading of the mechanical odometer in the cropped image is identified, the image processing engine 226 may be configured to determine if the numbers representing the reading of the mechanical odometer is white in color while the background on which the numbers are printed is black in color. Responsive to a positive determination, the image processing engine 226 is configured to transform the cropped image of the odometer by reversing the colors of the numbers and the background. That is, the image processing engine 226 may transform the cropped image of the odometer to have numbers representing the reading in black and the background in white. Responsive to transforming the cropped image or if the cropped image of the odometer already displays black numbers printed on a white background, the image processing engine 226 may obtain the reading of the mechanical odometer by applying OCR on the cropped image of the mechanical odometer.

However, responsive to determining that the odometer displayed in the cropped image is a digital odometer, the image processing engine 226 may determine if the unit of the reading associated with the digital odometer displayed in the cropped image can be identified/resolved from the cropped image. Responsive to a negative determination, the unit of the reading may be obtained based on the make and model of the vehicle 102 and/or the location associated with the image of the vehicle dashboard 104 as described above. Then, the image processing engine 226 may be configured to segment each digit of the digital odometer and input the image of each segmented digit to the odometer model. Upon receiving the image of each segment digit of the digital odometer, the odometer model outputs a reading (mileage) of the digital odometer of the vehicle 102.

In the case of digital gauges, upon receiving the cropped image of the digital gauge as input, the digital gauge model may be configured to identify a current position of a graphic/indicator representing a reading of the digital gauge from the cropped image. Further, a position of the graphic representing a maximum value or minimum value of the digital gauge may be identified based on the make and model of the vehicle 102 or from the cropped image using the digital gauge model. In either case, using geometrical analysis or any other appropriate analysis, the digital gauge model may determine a reading of the digital gauge displayed in the cropped image based on the current position of the graphic/indicator representing the reading of the digital gauge and the position of the maximum or minimum value of the digital gauge. An example graphic representing readings of digital gauges may include, but is not limited to, bars that represent fuel level in a digital fuel gauge.

Similarly, in the case of analog gauges, upon receiving the cropped image of the analog gauge as input, the analog gauge model may be configured to identify a current position of the tip of a needle (indicator) representing a reading of the analog gauge from the cropped image. Further, a location of a maximum value or minimum value in the analog gauge may be identified based on the make and model of the vehicle 102 or from the cropped image using the analog gauge model. In either case, using geometrical analysis or any other appropriate analysis, the analog gauge model may determine a reading of the analog gauge displayed in the cropped image based on the current position of the tip of the needle representing the reading of the analog gauge and the location of the maximum or minimum value of the analog gauge.

In the case of warning lights, upon receiving the cropped image of the warning lights as input, the warning lights model may be configured to identify if one or more warning lights are switched on and the condition of the vehicle identified by the warning lights from the cropped image. Responsive to a positive determination that a warning light is switched on, the image processing engine 226 may be configured to operate in concert with the alert generation engine 230 to generate an alert message indicating the warning light status to the user 108.

In some example embodiments, the odometer, the digital gauge, the analog gauge, and the warning lights may be read in parallel. That is the cropped images of each of said components may be inputted to their respective machine learning models and executed in parallel. However, in other example embodiments, the odometer, the digital gauge, the analog gauge, and the warning lights may be read sequentially.

Responsive to obtaining the readings associated with the one or more components of the vehicle dashboard 104, the image processing engine 226 may operate in concert with the display 210 to present the readings to the user 108. Further, the image processing engine 226 may operate in concert with the alert generation engine 230, the display 210, and the user interface 212 to generate a message requesting the user 108 to verify the readings. Responsive to negative verification result, the image processing engine 226 may be communicate with the exception handling engine 232 to mark the captured image of the vehicle dashboard 104 as an exception. Further, the exception handling engine 232 may store the captured image marked as an exception in an exceptions database 238 and/or provide the captured image as feedback to the training engine 222 to further train and optimize the machine learning models stored in the machine learning model database 234.

Responsive to a positive verification result, the image processing engine 226 may provide the positive verification result as feedback to the training engine 222 to further train the machine learning models stored in the machine learning model database 234. Additionally, the image processing engine 226 may communicate with the electronic form filling engine 218 to input the readings associated with the one or more components of the vehicle dashboard 104 in an electronic form that is stored in the electronic form database 236. In some embodiments, the verification step may be omitted and the electronic form filling engine 218 may input the readings associated with the one or more components of the vehicle dashboard in the electronic form without verifying an accuracy of the readings.

Figure 2B:
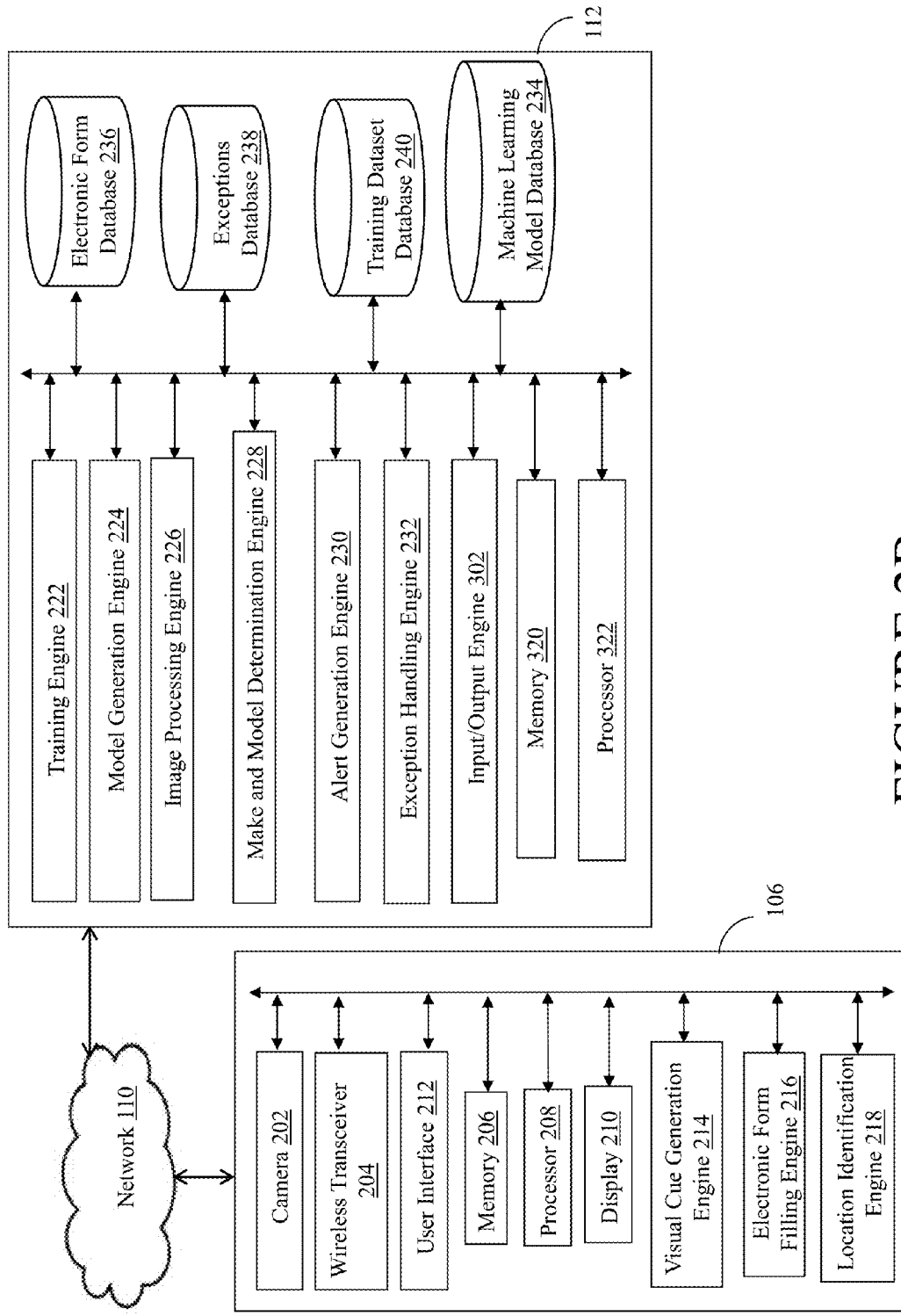
FIG. 2B illustrates a block diagram of the portable computing device and the dashboard analysis server of FIG. 1B, in accordance with example embodiments of the present disclosure.

Even though FIG. 2A illustrates the dashboard analysis engine 208 as being disposed in the portable computing device 106, one of ordinary skill in the art can understand and appreciate that in other example embodiments, dashboard analysis engine may be implemented external to the portable computing device 106, such as, in a server 112 as illustrated in FIG. 2B.

Turning to FIG. 2B, this figure illustrates a block diagram of the portable computing device and the dashboard analysis server of FIG. 1B, in accordance with example embodiments of the present disclosure. At the onset, it is noted that FIG. 2B may be substantially similar to FIG. 2A, except that the components of the dashboard analysis engine 220 are implemented in the server 112 that is communicably coupled to the portable computing device 106 via the network 110. As described above in association with FIG. 1B, the portable computing device 106 of FIG. 2B may be configured to capture an image of the vehicle dashboard 104 using the camera 202, user interface 212, the display 210, and/or the visual cue generation engine 214. Responsive to capturing the image, the location identification engine 218 of the portable computing device 106 may determine a location associated with the vehicle 102 and append the location data with the captured image in the form of metadata. Then, the portable computing device 106 may transmit the captured image of the vehicle dashboard 104 to the server 112 via the wireless transceiver 204 over the network 110.

The server 112 may receive the captured image of the vehicle dashboard 104 using the input/output engine 302 that is configured to enable communications to and from the server 112. Responsive to receiving the captured image of the vehicle dashboard 104, the server 112 may be configured to obtain and verify readings associated with one or more components of the vehicle dashboard 104 using the engines 222-232 as described above in association with FIG. 2A. The operations of the engines 222-232 are described above in association with FIG. 2A and will not be repeated herein for the sake of brevity. Further, the memory 320 of the server 112 may include instructions that may be executed by the processor 322 to perform operations of the engines 222-232. Similarly, the memory 206 of the portable computing device 106 may include instructions that may be executed by the processor 208 to perform operations of the portable computing device 106.

In one example embodiment, once the readings associated with one or more components of the vehicle dashboard 104 are obtained and/or verified, the input/output engine 302 of the server 112 may be configured to transmit the readings to the portable computing device 106 to input the readings in an electronic form using the electronic form filling engine 218. In some example embodiments, instead of performing the verification of the readings at the server 112, the portable computing device 106 may be configured to handle the process of verifying the readings.

Turning now to FIGS. 3-13, these figures include flow charts that illustrate the process for artificial intelligence based vehicle dashboard analysis. Although specific operations are disclosed in the flowcharts illustrated in FIGS. 3-13, such operations are exemplary. That is, embodiments of the present invention are well suited to performing various other operations or variations of the operations recited in the flowcharts. It is appreciated that the operations in the flowcharts illustrated in FIGS. 3-13 may be performed in an order different than presented, and that not all of the operations in the flowcharts may be performed.

All, or a portion of, the embodiments described by the flowcharts illustrated in FIGS. 3-13 can be implemented using computer-readable and computer-executable instructions which reside, for example, in computer-usable media of a computer system or like device. As described above, certain processes and operations of the present invention are realized, in one embodiment, as a series of instructions (e.g., software programs) that reside within computer readable memory of a computer system and are executed by the processor of the computer system. When executed, the instructions cause the computer system to implement the functionality of the present invention as described below.

Figure 3A:
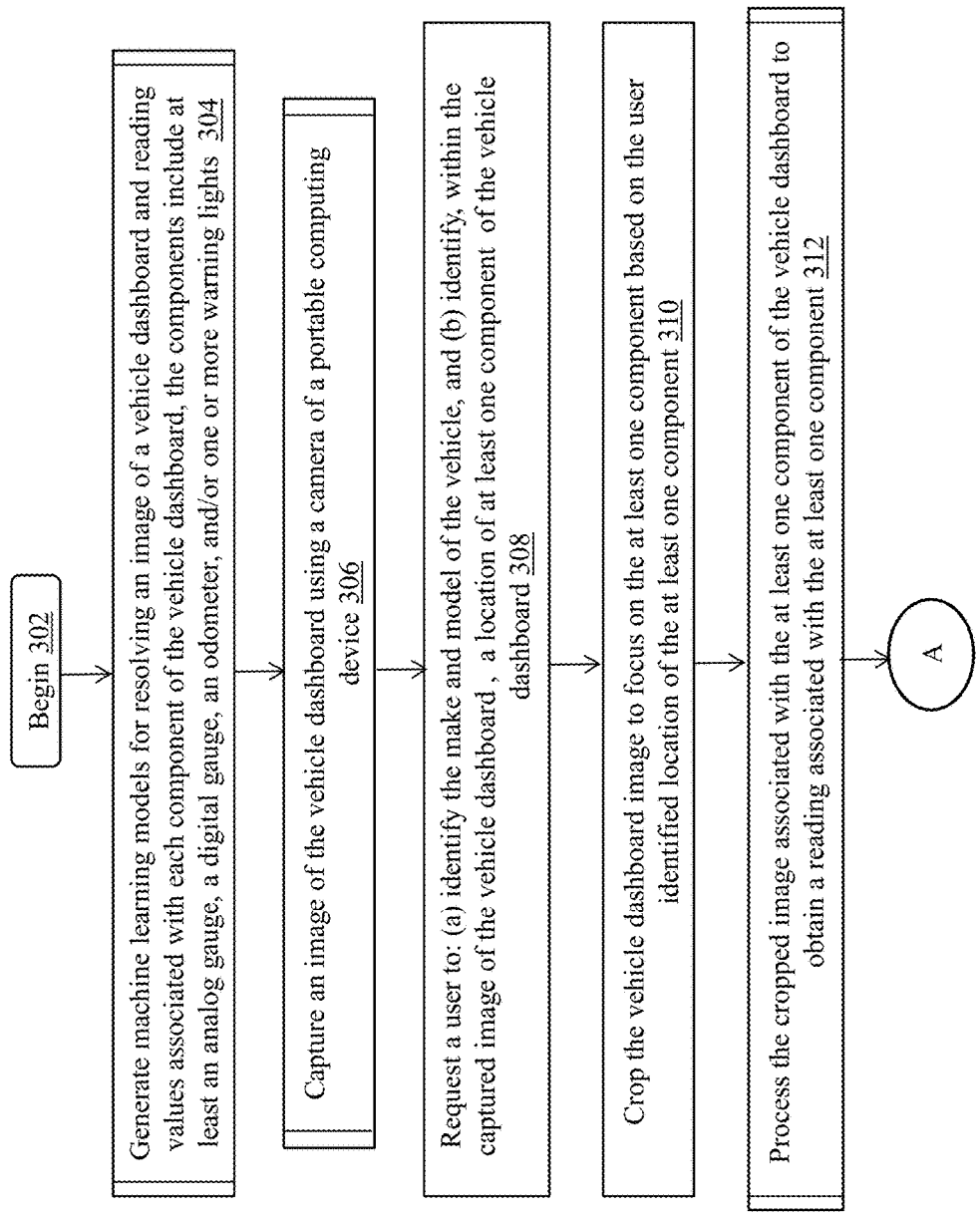
FIGS. 3A and 3B (collectively 'FIG. 3') illustrate an example dashboard analysis operation of the dashboard analysis system illustrated in FIG. 1A, in accordance with example embodiments of the present disclosure.
Figure 3B:
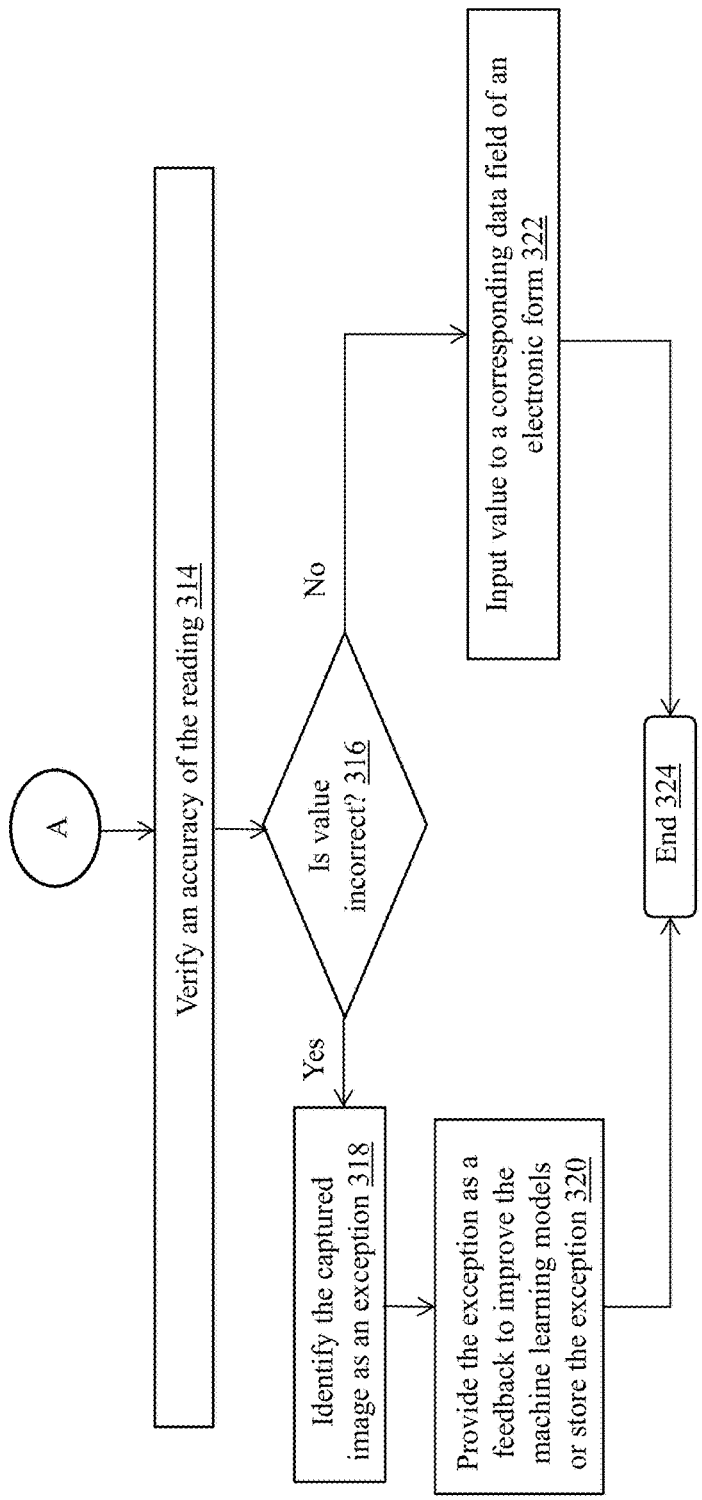

Turning to FIG. 3, this figure illustrates an example dashboard analysis operation of the dashboard analysis system illustrated in FIG. 1A, in accordance with example embodiments of the present disclosure. The dashboard analysis operation begins at operation 302 and proceeds to operation 304 where the training engine 222 of the portable computing device 106 may operate in concert with the model generation engine 224 to train and generate one or more machine learning models that are configured to obtain a reading associated with one or more components of a vehicle dashboard 104 from an image of the vehicle dashboard 104. Operation 304 will be described in greater detail below, in association with FIG. 6.

Figure 6:
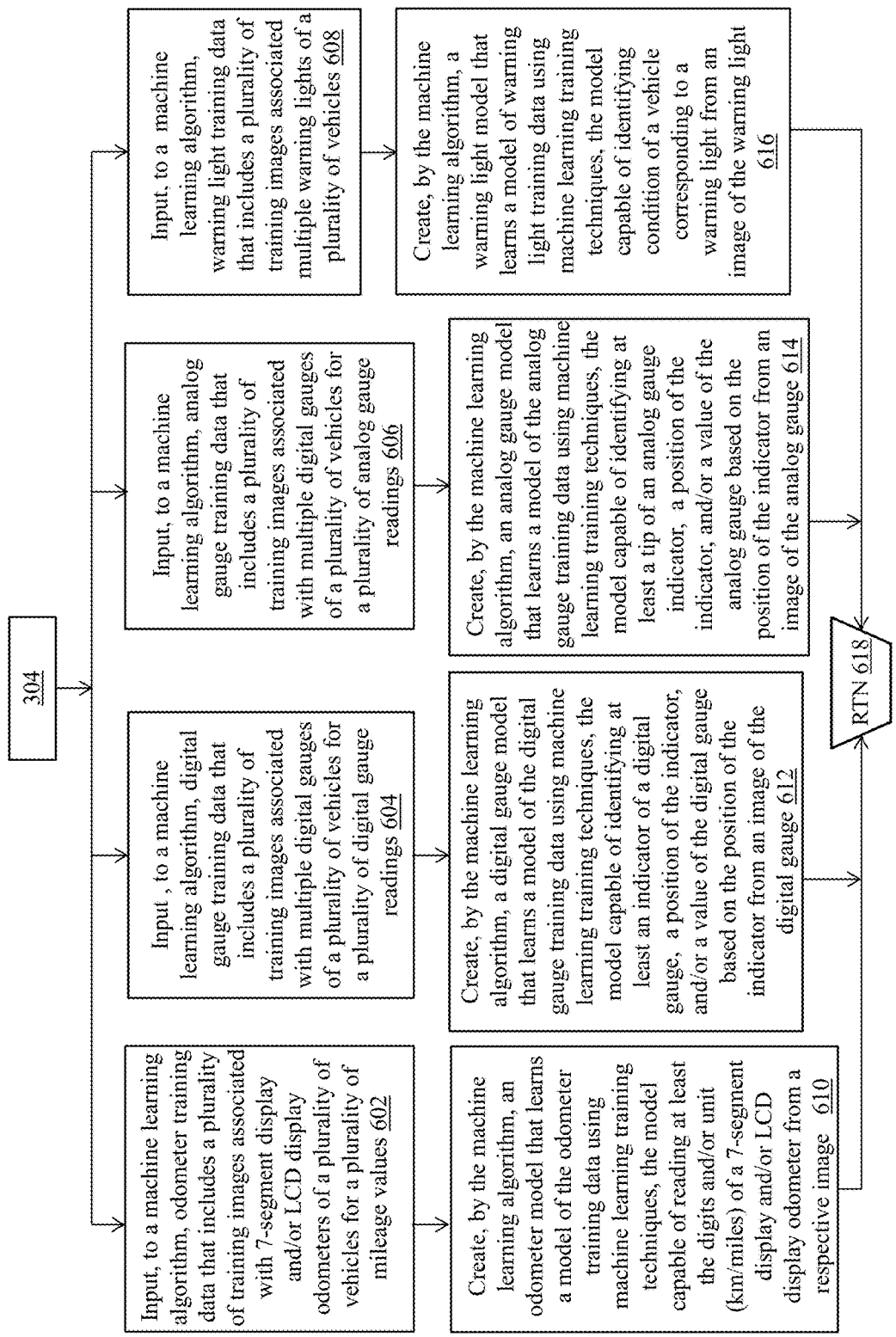
FIG. 6 illustrates an example machine learning model generation operation of the dashboard analysis system, in accordance with example embodiments of the present disclosure.

Turning to FIG. 6, this figure illustrates an example machine learning model generation operation of the dashboard analysis system, in accordance with example embodiments of the present disclosure. In operation 602, the dashboard analysis engine 220 of the portable computing device 106 may input odometer training data comprising a plurality of labelled and/or unlabeled training images of odometers to a machine learning algorithm of the training engine 222. The plurality of training images of odometers may include images of 7-segment LED display odometers and/or LCD display odometers for different makes and models of vehicles and for different odometer readings. Additionally, the plurality of training images of odometers may include images of vehicle dashboards that contain digital and/or mechanical odometers. For example, the plurality of training images of odometers may include five thousand images of odometer readings of random cars for both 7-segment displays and LCD displays along with dashboard images which contain the digital and/or mechanical odometers. Responsive to receiving the odometer training data, in operation 610, the machine learning algorithm of the training engine 222 may operate in concert with the model generation engine 224 to create and train an example machine learning model, e.g., an odometer model, to: (a) identify the position of an odometer within a vehicle dashboard from an image of the vehicle dashboard, (b) obtain a reading of a digital odometer by recognizing each digit of the digital odometer reading from an image of the digital odometer, (c) determine whether an odometer is a digital odometer or a mechanical odometer from an image of the odometer, and/or (d) obtain or determine a unit of the odometer reading from the image of the odometer. Additionally, in operation 610, responsive to creating the odometer model, the model generation engine 224 may store the odometer model in the machine learning model database 234.

In operation 604, the dashboard analysis engine 220 of the portable computing device 106 may input digital gauge training data comprising a plurality of labelled and/or unlabeled training images of digital gauges to a machine learning algorithm of the training engine 222. The plurality of training images of digital gauges may include images of digital gauges of a vehicle dashboard for different makes and models of vehicles and for different digital gauge readings. Additionally, the plurality of training images of digital gauges may include images of vehicle dashboards that contain digital gauges. For example, the plurality of training images of digital gauges may include images of digital fuel gauges of all varieties and readings (levels).

Responsive to receiving the digital gauge training data, in operation 612, the machine learning algorithm of the training engine 222 may operate in concert with the model generation engine 224 to create and train an example machine learning model, e.g., a digital gauge model, to: (a) identify the position of a digital gauge within a vehicle dashboard from an image of the vehicle dashboard, (b) identify a graphic/indicator that indicates a reading of a digital gauge from an image of the digital gauge, (c) identify the current position of an graphic/indicator within the digital gauge with respect to a maximum and/or minimum value of the digital gauge from the image of digital gauge, and (d) obtain or determine a reading of the digital gauge based on the current position of the graphic/indicator within the digital gauge with respect to the position of the maximum and/or minimum value of the digital gauge. Additionally, in operation 612, responsive to creating the digital gauge model, the model generation engine 224 may store the digital gauge model in the machine learning model database 234.

In some example embodiments, the position of the maximum and/or minimum value of the digital gauge may be determined based on the data provided from external sources and/or the make and model of the vehicle 102. In other example embodiments, the position of the maximum and/or minimum value of the digital gauge may be determined using training images where the digital gauge reading indicates maximum or minimum value. For example, in a digital fuel gauge where the fuel level is represented using bars, the digital gauge model may identify the height of the bar when the digital fuel gauge represents a full tank of fuel or an empty fuel tank. Alternatively, the position of the maximum and/or minimum value of the digital gauge may be determined based on other attributes in the image of the digital gauge. For example, the digital gauge model may identify the position of the maximum and/or minimum value of the digital fuel gauge based on where the alphabets 'E' indicating empty and 'F' indicating full are located.

In operation 606, the dashboard analysis engine 220 of the portable computing device 106 may input analog gauge training data comprising a plurality of labelled and/or unlabeled training images of analog gauges to a machine learning algorithm of the training engine 222. The plurality of training images of analog gauges may include images of analog gauges of a vehicle dashboard for different makes and models of vehicles and for different analog gauge readings. Additionally, the plurality of training images of analog gauges may include images of vehicle dashboards that contain analog gauges. For example, the plurality of training images of odometers may include images of analog fuel gauges of all varieties and readings (levels). Responsive to receiving the analog gauge training data, in operation 614, the machine learning algorithm of the training engine 222 may operate in concert with the model generation engine 224 to create and train an example machine learning model, e.g., an analog gauge model, to: (a) identify the position of an analog gauge within a vehicle dashboard from an image of the vehicle dashboard, (b) identify a tip of a needle that indicates a reading of an analog gauge from an image of the analog gauge, (b) identify the current position of a tip of the needle within the analog gauge with respect to a maximum and/or minimum value of the analog gauge from the image of analog gauge, and (d) obtain or determine a reading of the analog gauge based on the current position of the tip of the needle with respect to the maximum and/or minimum value of the analog gauge. Additionally, in operation 614, responsive to creating the analog gauge model, the model generation engine 224 may store the analog gauge model in the machine learning model database 234.

As described above in association with the digital gauge, the position of the maximum and/or minimum value of the analog gauge may be determined based on the data provided from external sources and/or the make and model of the vehicle. Alternatively, the position of the maximum and/or minimum value of the analog gauge may be determined using training images where the analog gauge reading indicates maximum or minimum value and/or based on other attributes.

In operation 608, the dashboard analysis engine 220 of the portable computing device 106 may input warning light training data comprising a plurality of labelled and/or unlabeled training images of warning lights to a machine learning algorithm of the training engine 222. The plurality of training images may include images of different warning lights for different makes and models of vehicles. Additionally, the plurality of training images may include images of vehicle dashboards that contain warning lights. For example, the plurality of training images of warning lights may include fifty images of each warning light for different makes and models of vehicles along with dashboard images which contain the warning lights. Responsive to receiving the warning light training data, in operation 616, the machine learning algorithm of the training engine 222 may operate in concert with the model generation engine 224 to create and train an example machine learning model, e.g., a warning light model, to: (a) identify the position of an warning light within a vehicle dashboard from an image of the vehicle dashboard, (b) identify whether a warning light is switched on from an image of the warning light, and (c) identify the warning light symbol and the condition of the vehicle represented by the warning light symbol. For example, fifty images of engine malfunction warning light of a specific make and model of vehicle are used by the machine learning algorithm to train the warning light model to recognize the engine malfunction warning light symbol in dashboard image of the specific make and model of vehicle. Additionally, in operation 616, responsive to creating the warning light model, the model generation engine 224 may store the warning light model in the machine learning model database 234.

In one example embodiment, the training and generation of the one or more machine learning models may be completed as an initial set-up process when a dashboard analysis engine application is downloaded and installed on the portable computing device 106. In another example embodiment, the training and generation of the one or more machine learning models may be completed based on a user request after the dashboard analysis application is installed on the portable computing device 106. In yet another example embodiment, the training and generation of the one or more machine learning models may be completed outside of the portable computing device 106 and only the pre-trained machine learning models may be stored in the portable computing device 106.

Even though the example embodiment of FIG. 6 illustrates the position of the odometer, the digital gauge, the analog gauge, and the warning light within the vehicle dashboard being determined by the odometer model, the digital gauge model, the analog gauge model, and the warning light model, respectively, in other example embodiments, the machine learning algorithm of the training engine 222 may create a dedicated machine learning model, e.g., location model, for determining the position of the odometer, the digital gauge, the analog gauge, and the warning light within the vehicle dashboard form an image of the vehicle dashboard without departing from a broader scope of the present disclosure. Further, even though the example embodiment of FIG. 6 illustrates four different machine learning models configured to obtain a reading associated with the odometer, the digital gauge, the analog gauge, and the warning light, one of ordinary skill in the art can understand and appreciate that in other example embodiments, the machine learning algorithm may generate additional machine learning models configured to obtain any other appropriate data associated with the vehicle from the image of the vehicle's dashboard without departing from a broader scope of the present disclosure. For example, FIG. 7 illustrates an additional machine learning model configured to determine the make and model of the vehicle.

Figure 7:
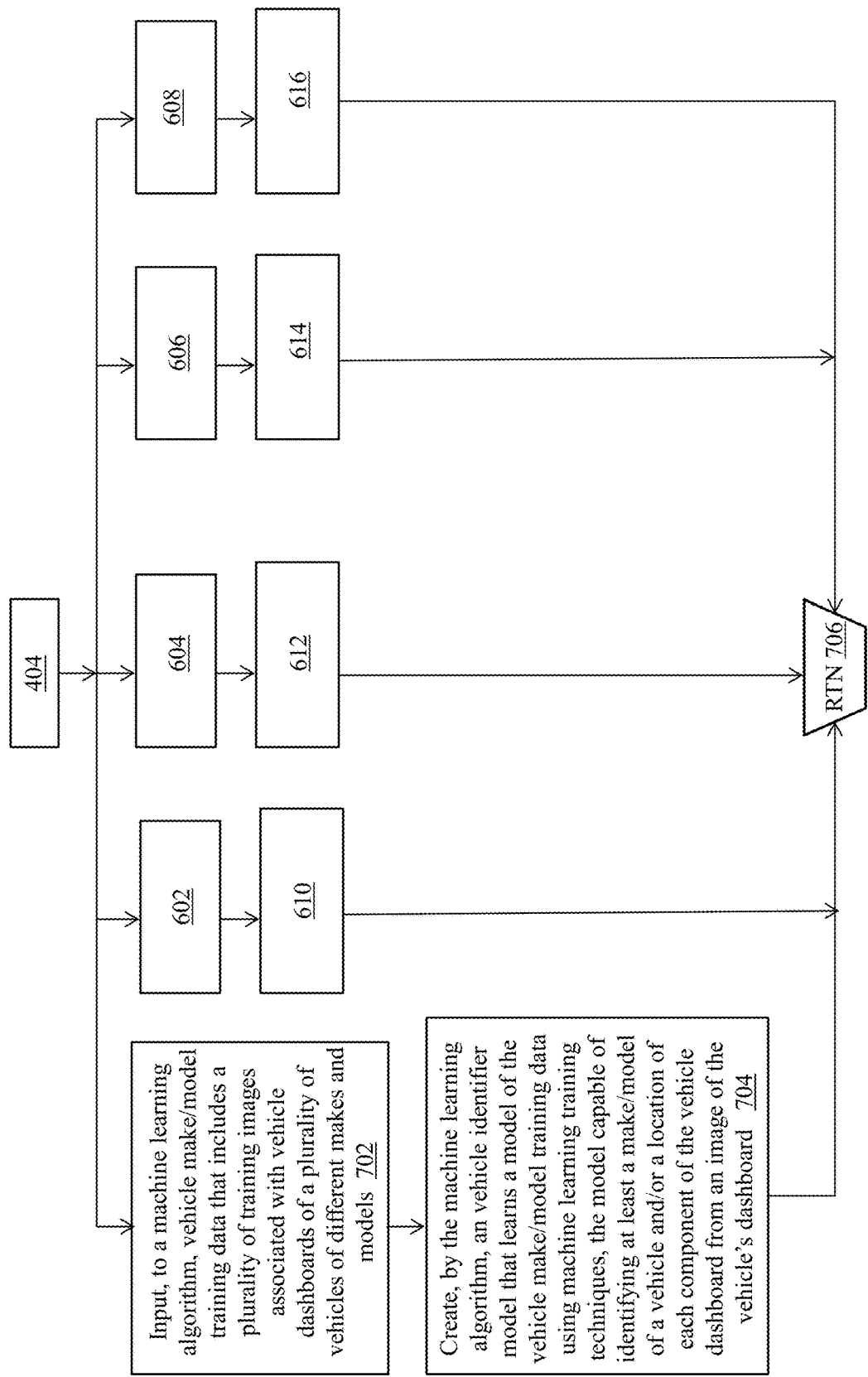
FIG. 7 illustrates another example machine learning model generation operation of the dashboard analysis system, in accordance with example embodiments of the present disclosure.

FIG. 7 illustrates another example machine learning model generation operation of the dashboard analysis system, in accordance with example embodiments of the present disclosure. In operation 702, the dashboard analysis engine 220 of the portable computing device 106 may input vehicle make/model training data comprising a plurality of labelled and/or unlabeled training images of vehicle dashboards to a machine learning algorithm of the training engine 222. For example, the plurality of training images may include approximately hundred vehicle dashboard images of each vehicle of different makes and models. Responsive to receiving the vehicle make/model training data, in operation 704, the machine learning algorithm of the training engine 222 may operate in concert with the model generation engine 224 to create and train an example machine learning model, e.g., an vehicle type model, to identify the make and model of a vehicle 102 from an image of the vehicle dashboard 104 of the vehicle 102. In some example embodiments, the vehicle type model may also be trained to identify the position of one or more components (e.g., odometer, digital gauge, analog gauge, and/or warning lights) within a vehicle dashboard from the image of the vehicle dashboard. Additionally, in operation 704, the model generation engine 224 may also store the vehicle type model in the machine learning model database 234.

The training dataset database 240 that stores the odometer training data, the digital gauge training data, the analog gauge training data, the warning light training data, and/or the vehicle make/model training data may periodically updated to add images of newer makes and models of vehicles. The periodic updating of the training dataset database 240 allows the machine learning algorithm to train and update the machine learning models to account for the newer makes and models of vehicles.

Even though the present disclosure describes a specific number of training images being used to train each machine learning model, one of ordinary skill in the art can understand that the number of training images described herein is exemplary and is not limiting. In other example embodiments, the number of training images used to train each machine learning models described herein may vary without departing from a broader scope of the present disclosure. Also, it is noted that the example machine learning models described herein are not exhaustive. That is, in other example embodiments, more or lesser number of machine learning models may be generated and trained without departing from a broader scope of the present disclosure.

Figure 4A:
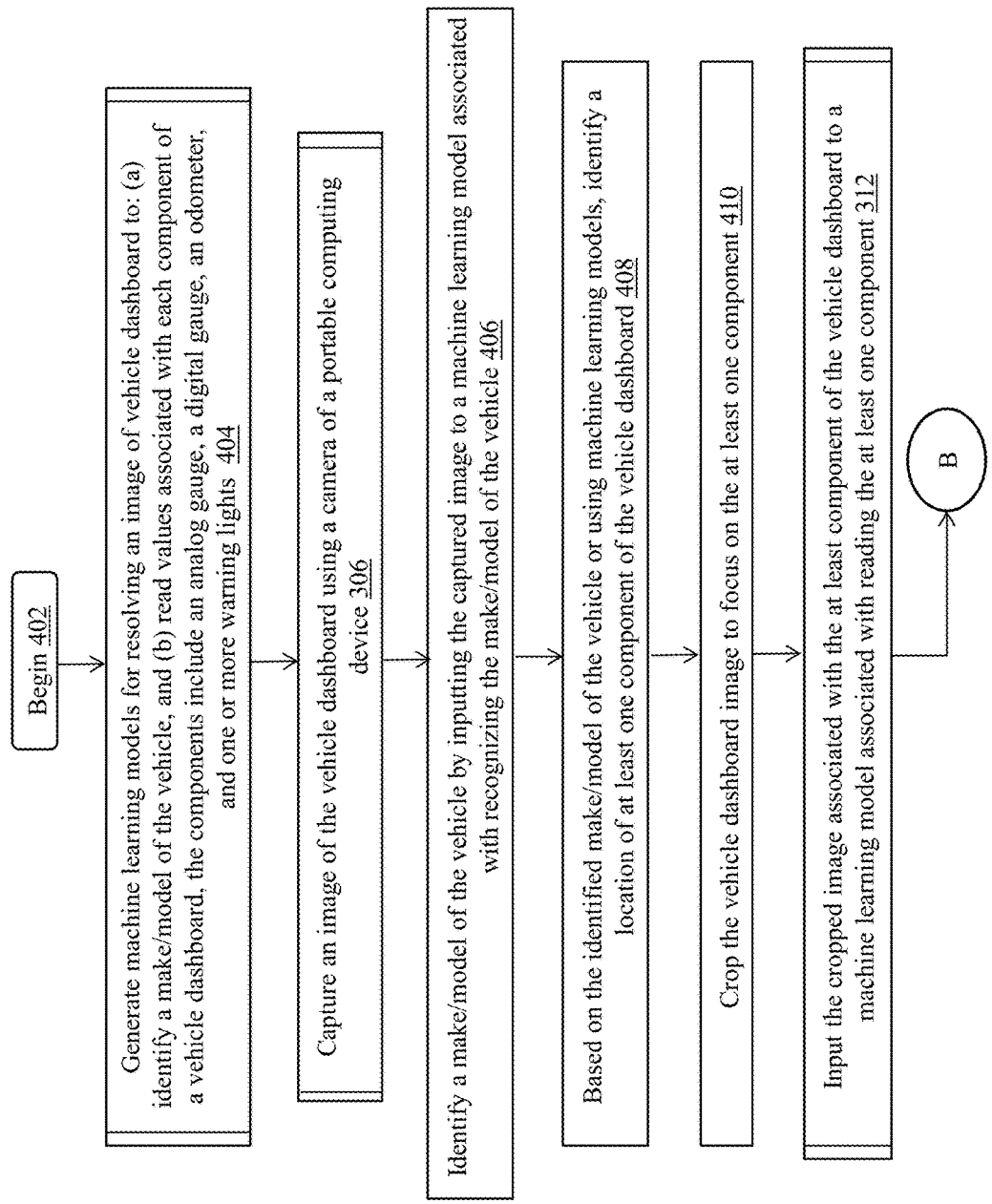
FIGS. 4A and 4B (collectively 'FIG. 4') illustrate another example dashboard analysis operation of the dashboard analysis system illustrated in FIG. 1A, in accordance with example embodiments of the present disclosure.
Figure 4B:
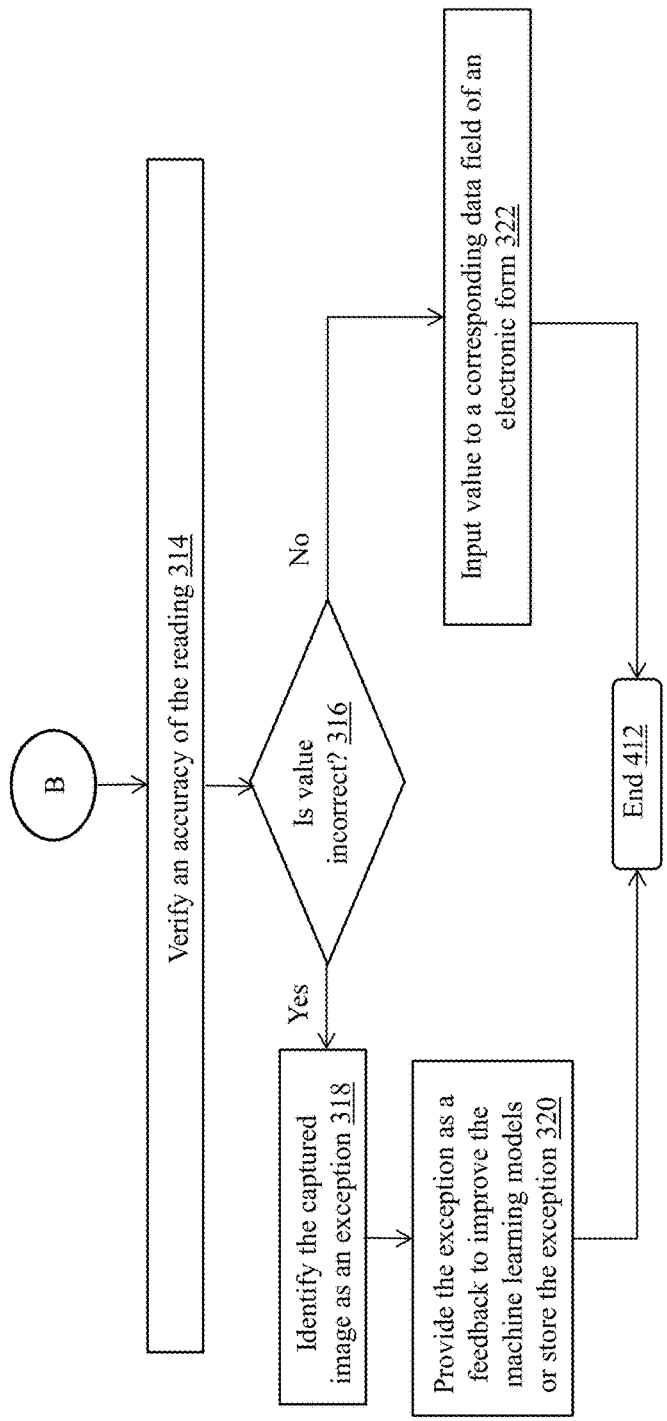
Figure 5A:
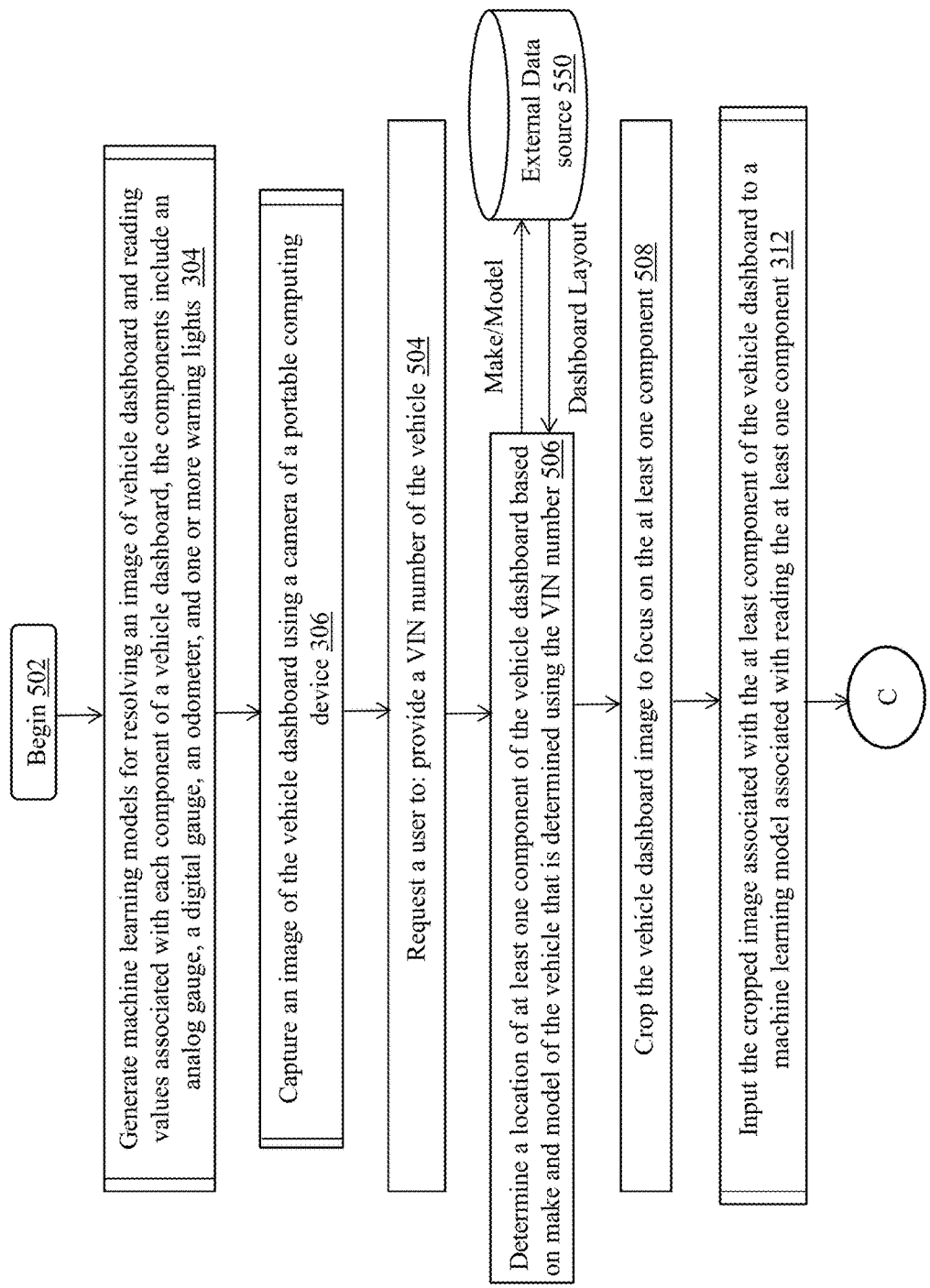
FIGS. 5A and 5B (collectively 'FIG. 5') illustrate yet another example dashboard analysis operation of the dashboard analysis system illustrated in FIG. 1A, in accordance with example embodiments of the present disclosure.
Figure 5B:
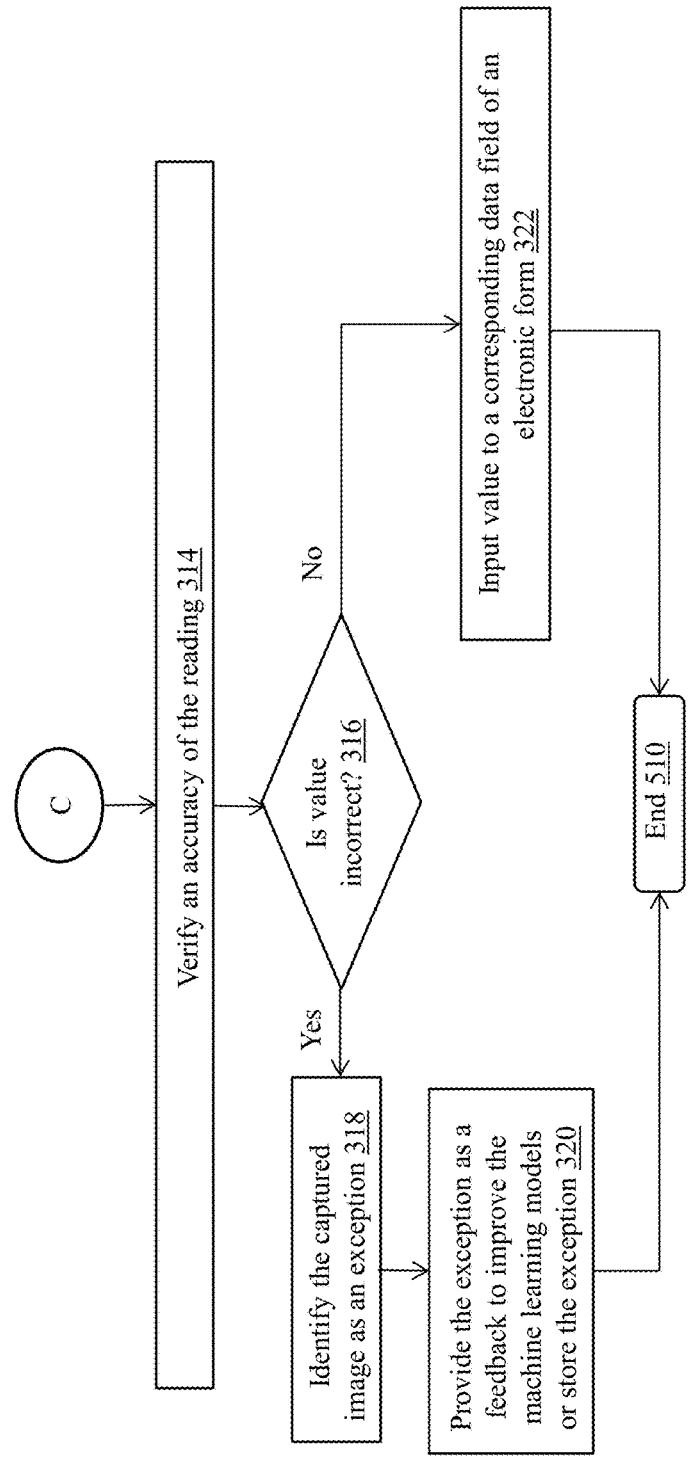

Once the one or more machine learning models are generated, the dashboard analysis operation returns to operation 306 of FIG. 3 (or FIGS. 4 and 5). Referring back to FIG. 3, in operation 306, the user 108 may interact with the portable computing device 106 to capture an image of the dashboard 104 of a vehicle 102 whose data is to be obtained. Operation 306 will be described in greater detail below in association with FIG. 8.

Figure 8:
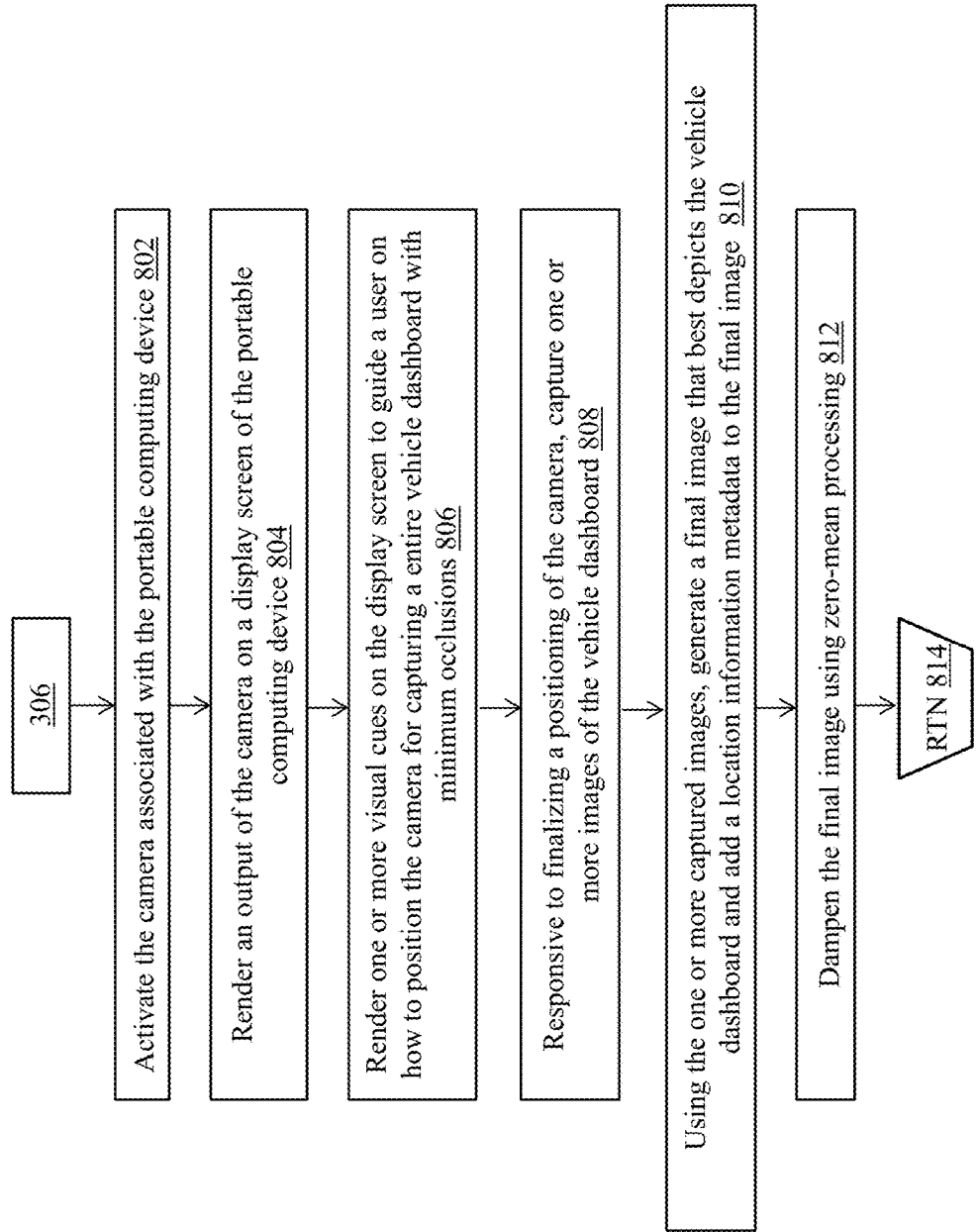
FIG. 8 illustrates an example image capture operation of the dashboard analysis system, in accordance with example embodiments of the present disclosure.
Figure 9B:
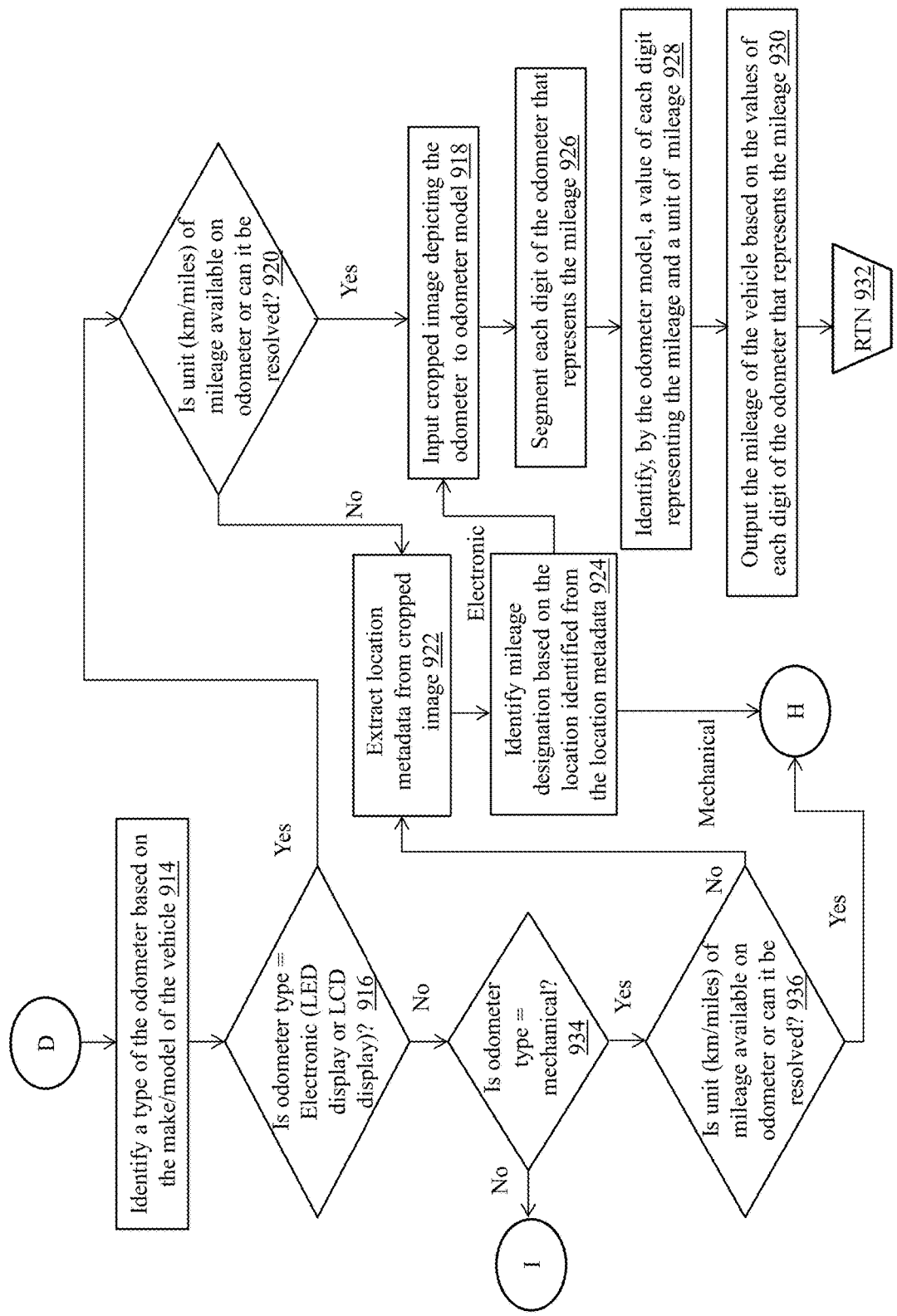
Figure 9C:
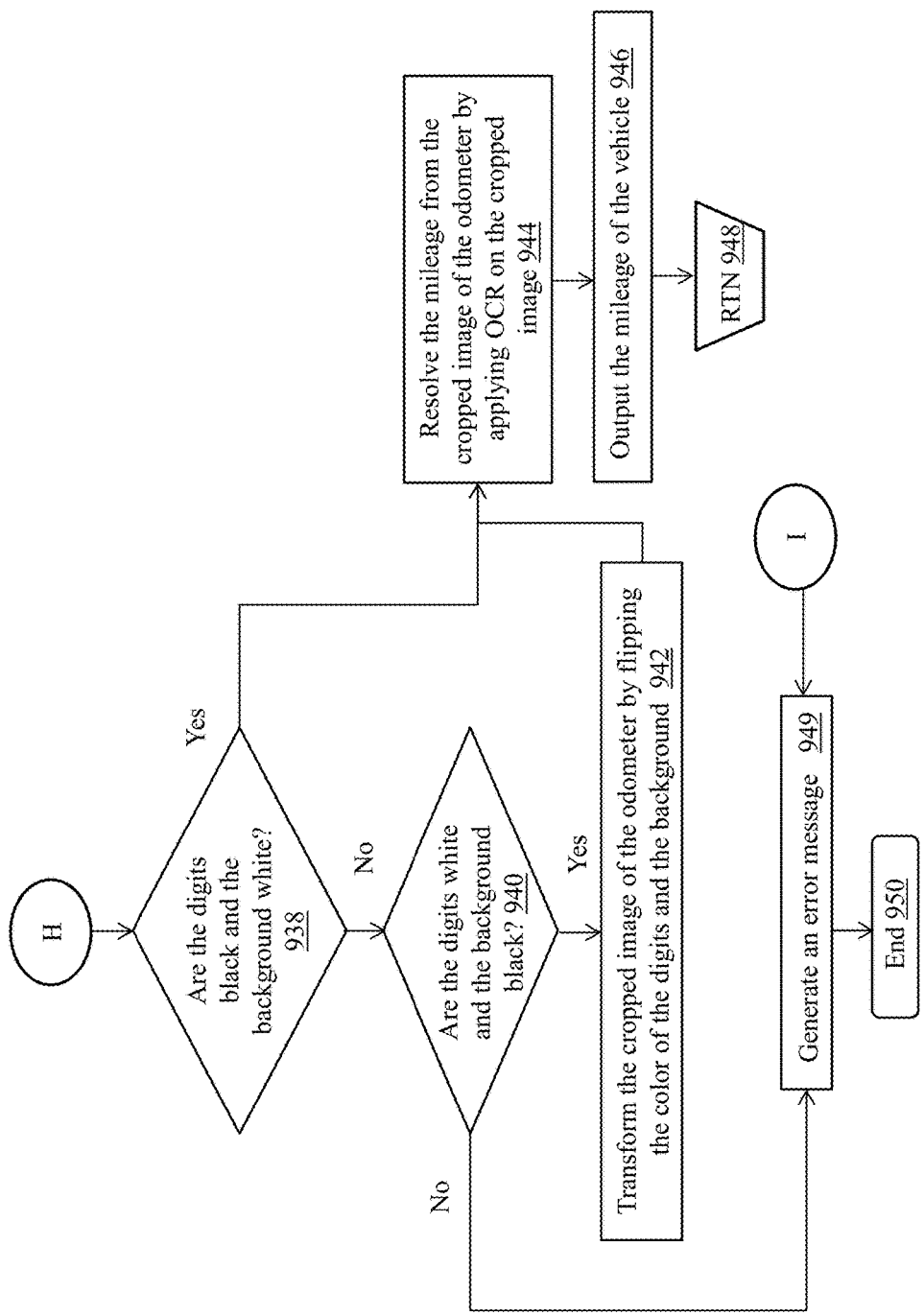
Figure 9D:
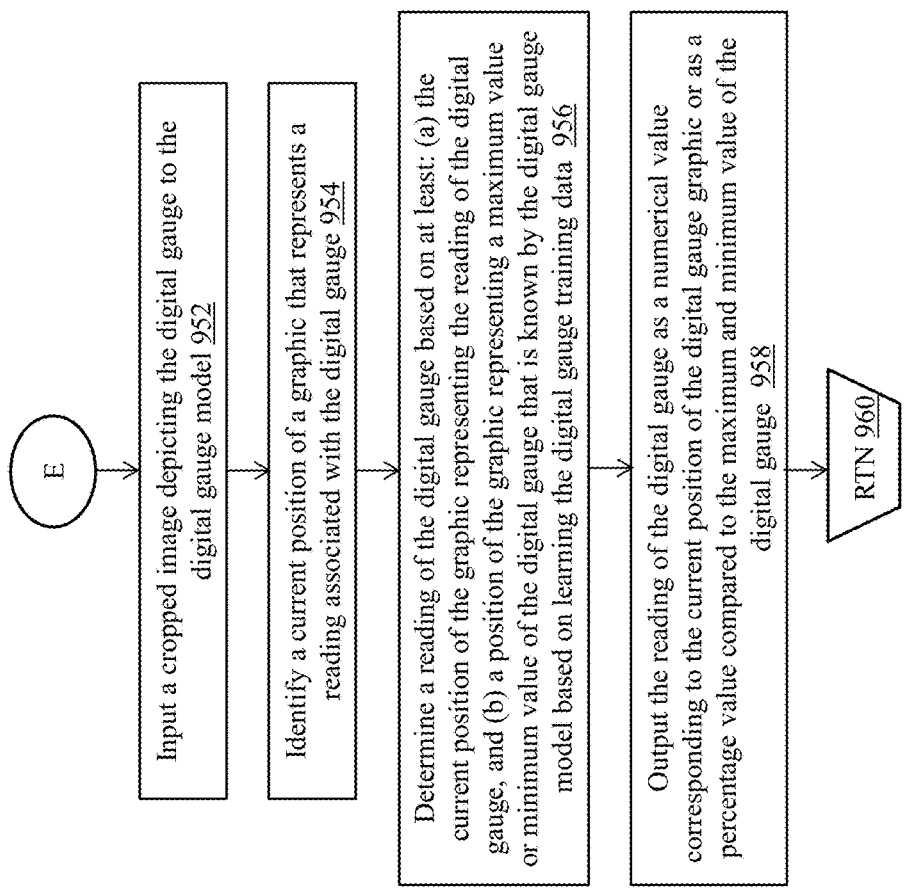
Figure 9E:
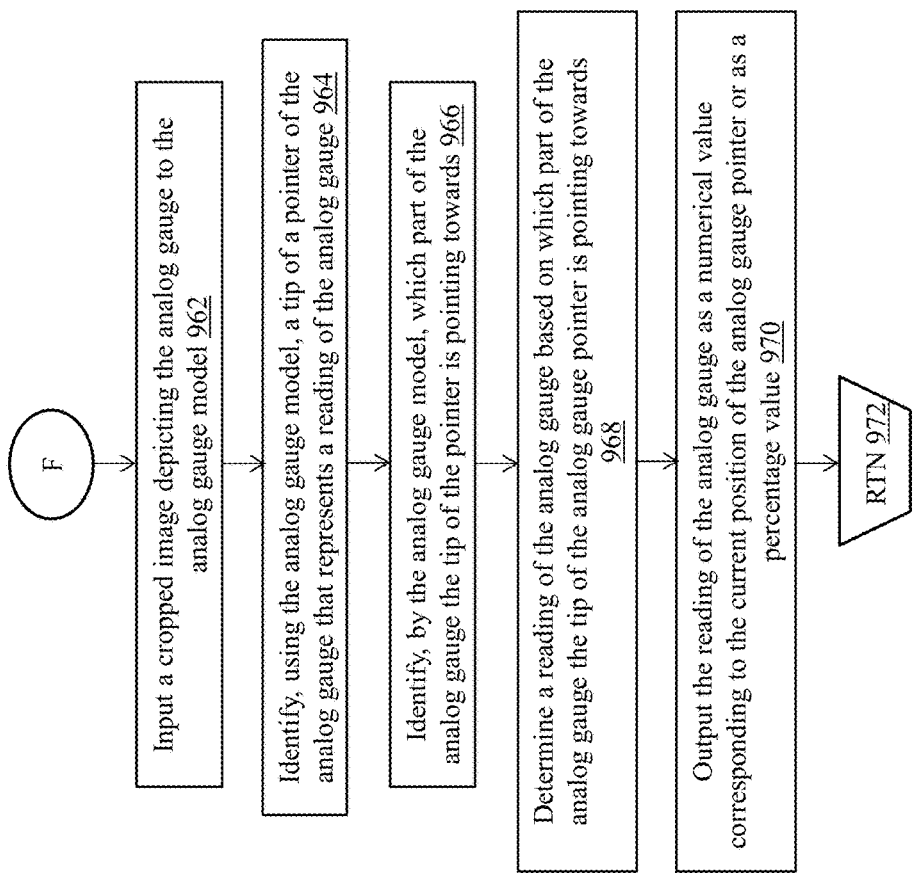
Figure 9F:
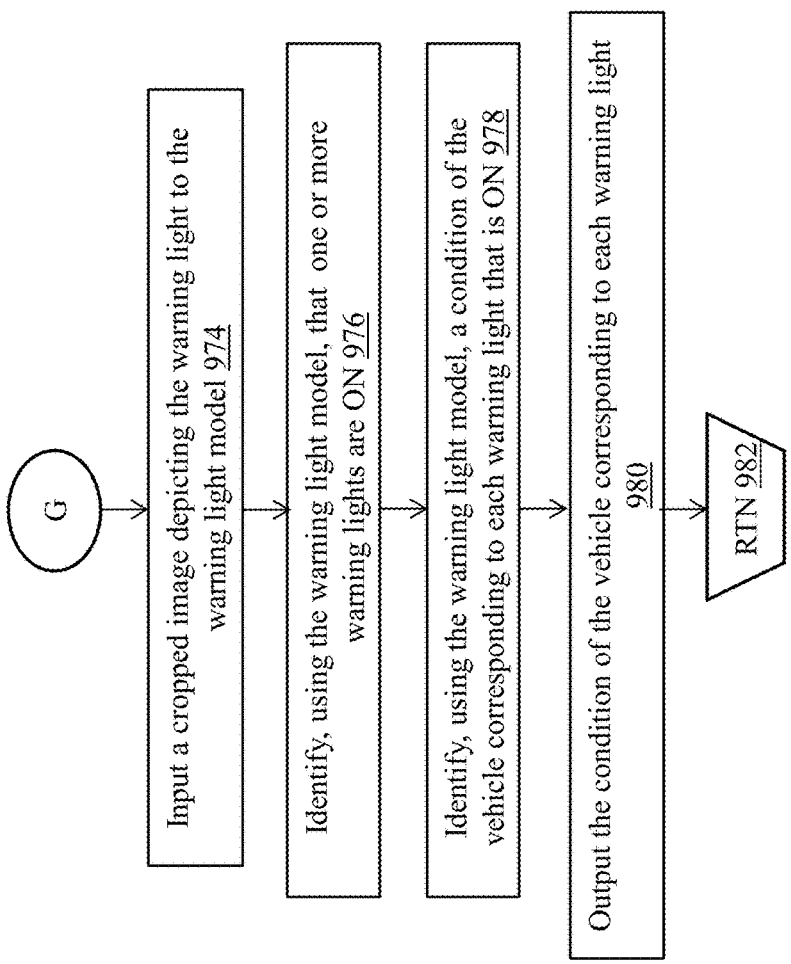

Turning to FIG. 8, this figure illustrates an example image capture operation of the dashboard analysis system, in accordance with example embodiments of the present disclosure. In operation 802, the user 108 may interact with the portable computing device 106 via the user interface 212 to activate the camera 202. Further, the user 108 may point the camera 202 towards the vehicle dashboard 104. Responsive to activating the camera 202, in operation 804, the processor 208 of the portable computing device 106 may render an image feed of the camera 202 on a display screen 210 of the portable computing device 108. In operation 806, the processor 208 may interact with the visual cue generation engine 214 to render one or more visual cues on the display screen 210 to guide a user on how to position the camera 202 such that an entire vehicle dashboard can be captured in the image with minimal occlusion. Once the position of the camera 202 has been finalized, in operation 808, an image of the vehicle dashboard 104 may be captured. In some example embodiments, more than one image of the vehicle dashboard 104 may be captured and combined to generate a high resolution image of the vehicle dashboard 104. Additionally, in operation 808, the location identification engine 216 of the portable computing device 106 may determine a location associated with the image of the vehicle 102 and append the location information to the captured image of the vehicle dashboard 104. Responsively, in operation 812, the processor 208 of the portable computing device 106 may dampen the captured image using zero-mean processing. Then, the process returns to operation 308 of FIG. 3.

Referring back to FIG. 3, in operation 308, the processor 208 of the portable computing device 106 may generate and present the captured image of the vehicle dashboard 104 via the display 210 and request the user to identify: (a) a make and model of the vehicle, and/or (b) a location of at least one component of the vehicle dashboard within the captured image. For example, the portable computing device 106 may request the user 108 to identify the location of the warning light within the captured image. In said example, the user 108 may identify the location of the warning light by touching a portion of the display screen 210 corresponding to the location of the warning light in the captured image that is displayed on the display screen 210. In other examples, any other form of interaction may be used to identify the location of the at least one component of the vehicle dashboard without departing from a broader scope of the present disclosure.

Responsive to receiving a user input identifying the location of the at least one component of the vehicle dashboard within the captured image, in operation 310, the image processing engine 226 of the portable computing device may segment or crop the portion of the captured image corresponding to the location of the at least one component. Further, in operation 312, the image processing engine 226 may process the cropped image of the at least one component of the vehicle dashboard to obtain a reading of the at least one component. Operation 312 may be described in greater detail below in association with FIG. 9.

Turning to FIG. 9, this figure illustrates an example dashboard component reading operation of the dashboard analysis system using machine learning models, in accordance with example embodiments of the present disclosure. If the component is an odometer, in operation 902, the dashboard analysis operation proceeds to operation 914 where the image processing engine 226 identifies a type of the odometer based on a make and model of the vehicle 102 which is received as a user input in operation 308 of FIG. 3. In operation 916, responsive to determining that the odometer is a digital odometer, the image processing engine 226 may proceed to operation 918 where the image processing engine 226 determines whether a unit of the reading associated with the digital odometer can be obtained from the cropped image of the digital odometer. If the unit of the reading associated with the odometer cannot be obtained from the cropped image of digital odometer, then, in operations 922 and 924, the image processing engine 226 may extract the location data appended to the captured image of the vehicle dashboard 104 and identify the unit of the reading associated with the digital odometer based on the location of the vehicle 102 obtained from the location data. Responsive to identifying the unit of the reading associated with the digital odometer or responsive to determining that the unit of the reading associated with the digital odometer can be obtained from the cropped image of the digital odometer, in operation 920, the image processing engine 226 may provide the cropped image of the digital odometer as input to the odometer model stored in the machine learning model database 234.

Upon receiving the cropped image of the digital odometer, in operations 926-930, the odometer model may segment each digit of the digital odometer corresponding to the reading of the digital odometer, recognize each segmented digit, and output the digital odometer reading, i.e., the mileage of the vehicle 102, based on the recognized digits of the digital odometer reading along with the unit associated with the digital odometer reading. Responsively, the dashboard analysis operation returns to operation 314 of FIG. 3.

However, in operation 916, if the odometer is not a digital odometer, the dashboard analysis operation proceeds to operation 934 where the image processing engine 226 determines whether the odometer is a mechanical odometer. Responsive to determining that the odometer is a mechanical odometer, the image processing engine 226 proceeds to operation 936 where the image processing engine 226 determines whether a unit of the reading associated with the mechanical odometer can be obtained from the cropped image of the mechanical odometer. If the unit of the reading associated with the odometer cannot be obtained from the cropped image of mechanical odometer, then, in operations 922 and 924, the image processing engine 226 may identify the unit of the reading associated with the mechanical odometer based on the location as described above.

Once the unit of the reading associated with the mechanical odometer is identified, the dashboard analysis operation proceeds to operation 938 where the image processing engine 226 determines whether the mechanical odometer reading is represented by black digits disposed on white background. Responsive to a negative determination, in operation 940, the image processing engine 226 may determine whether the mechanical odometer reading is represented by white digits disposed on black background. If the mechanical odometer reading is represented by white digits disposed on black background, then, in operation 942, the image processing engine 226 may transform the cropped image of the mechanical odometer by flipping/reversing the color of the digits and the background. That is, the image processing engine 226 may transform the cropped image of the mechanical odometer to have black digits disposed on a white background. Responsive to transforming the cropped image of the mechanical odometer or responsive to a positive determination that the mechanical odometer reading in the cropped image is represented by black digits disposed on white background, in operation 944, the image processing engine 226 may obtain the reading associated with the mechanical odometer by applying OCR to each digit in the cropped image of the mechanical odometer. Further, in operation 946, the image processing engine 226 may output the mechanical odometer reading, i.e., the mileage of the vehicle 102 along with the unit associated with the mechanical odometer reading. Then, in operation 948, the dashboard analysis operation returns to operation 314 of FIG. 3.

Responsive to determining that the mechanical odometer reading in the cropped image is not represented by white digits on black background or black digits disposed on a white background, in operation 949, the image processing engine 226 may generate an error message for presentation via the display 210 of the portable computing device 106. Similarly, responsive to determining that the odometer is not a digital odometer or a mechanical odometer, the image processing engine 226 may generate an error message for presentation via the display 210 of the portable computing device 106.

Returning to operation 902, responsive to determining that the at least one component is not an odometer, the dashboard analysis operation proceeds to operation 904 where the image processing engine 226 may determine if the at least one component is a digital gauge. If the at least one component is a digital gauge, then, the dashboard analysis operation proceeds to operation 952 where the image processing engine 226 provides the cropped image of the digital gauge as an input to the digital gauge model stored in the machine learning models database 234. Responsive to receiving the cropped image of the digital gauge, in operation 954, the digital gauge model may identify a current position of a graphic/indicator that represents a reading associated with the digital gauge from the received image. Further, in operation 956, the digital gauge model may determine, using graphical analysis, a reading associated with the digital gauge based on the current position of a graphic/indicator in the digital gauge and a position of the maximum or minimum value of the digital gauge. The position of the maximum or minimum value of the digital gauge may be determined either by the digital gauge model from the received cropped image of the digital gauge or based on a make and model of the vehicle 102. In either case, responsive to determining the reading associated with the digital gauge, the digital gauge model may output the reading associated with the digital gauge and return to operation 314 of FIG. 3.

Returning to operation 904, responsive to determining that the at least one component is not a digital gauge, in operation 906, the image processing engine 226 may determine if the at least one component is an analog gauge. In an example embodiment, the image processing engine 226 may determine whether the at least one component is a digital gauge or an analog gauge based on the make and model of the vehicle 102. For example, if the component is a fuel gauge, the image processing engine 226 may determine if the fuel gauge is a digital gauge or an analog gauge based on the make and model of the vehicle 102.

If the at least one component is an analog gauge, then, the dashboard analysis operation proceeds to operation 962 where the image processing engine 226 provides the cropped image of the analog gauge as an input to the analog gauge model stored in the machine learning models database 234. Responsive to receiving the cropped image of the analog gauge, in operation 954, the analog gauge model may identify a current position of a tip of a needle that represents a reading associated with the analog gauge from the received image. Further, in operation 956, the analog gauge model may determine, using graphical analysis, a reading associated with the analog gauge based on the current position of the tip of the needle of the analog gauge and a position of the maximum or minimum value of the analog gauge. The position of the maximum or minimum value of the analog gauge may be determined either by the analog gauge model from the received cropped image of the analog gauge or based on a make and model of the vehicle 102. In either case, responsive to determining the reading associated with the analog gauge, the analog gauge model may output the reading associated with the analog gauge and return to operation 314 of FIG. 3.

Returning to operation 906, responsive to determining that the at least one component is not a digital gauge, in operation 908, the image processing engine 226 may determine if the at least one component is a warning light. If the at least one component is a warning light, then, the dashboard analysis operation proceeds to operation 974 where the image processing engine 226 provides the cropped image of the warning light as an input to the warning light model stored in the machine learning models database 234. Responsive to receiving the cropped image of the warning light, in operation 976, the warning light model may determine that the warning light in the received image is switched on. Responsively, in operation 978, the warning light model may determine, a condition of the vehicle 102 represented by the warning light in the received image. Further, in operation 980, the warning light model may generate and output and alert indicating the status of the warning light and the condition of the vehicle associated with the warning light. Then, the dashboard analysis process proceeds to operation 314 of FIG. 3.

Figure 10:
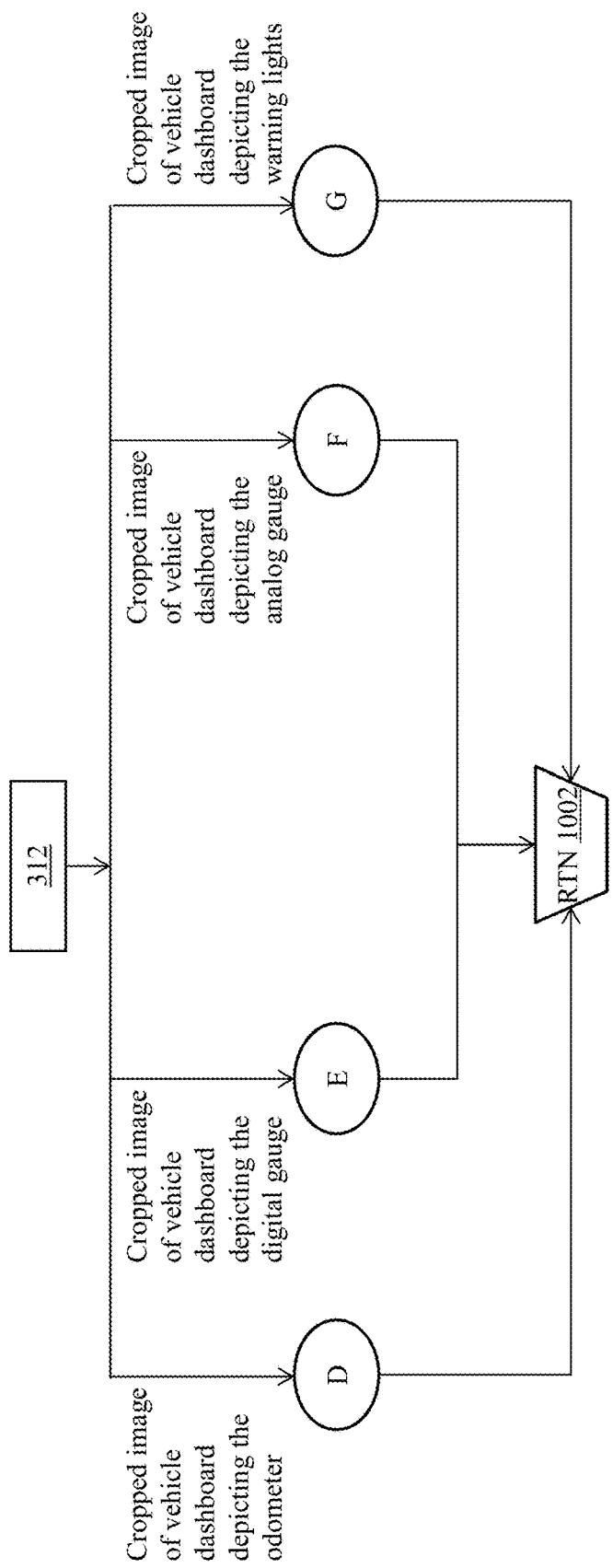
FIG. 10 illustrates another example dashboard component reading operation of the dashboard analysis system, in accordance with example embodiments of the present disclosure.

Even though FIG. 9 illustrates a sequential execution of the operations associated with obtaining the readings of the different components of the vehicle dashboard, one of ordinary skill in the art can understand and appreciate that in other example embodiments, said operations may be executed in parallel without departing from a broader scope of the present disclosure. For example, FIG. 10 illustrates a parallel execution of the operations associated with obtaining a reading of the odometer, the digital gauge, the analog gauge, and the warning lights. In FIG. 10, once the location of each component of the vehicle dashboard in the captured image is identified and the image of said components have been cropped out from the captured image of the vehicle dashboard, the cropped images of each component may be inputted in parallel to respective machine learning models such that the machine learning models may process the cropped images in parallel to obtain readings associated with the components of the vehicle dashboard 104.

In either case, once the readings associated with the different components of the vehicle dashboard are obtained from their respective machine learning models, the dashboard analysis process returns to operation 314 of FIG. 3 where the readings are presented to a user 108 via a display 210 of the portable computing device 106. In addition to presenting the readings, in operation 314, the portable computing device 106 generates and presents a message via the display 210, where the message requests the user 108 to verify that the readings obtained from the machine learning models substantially match the readings displayed by the respective components in the captured image of vehicle dashboard. Responsive to a positive verification result, in operation 322, the electronic form filling engine 218 may input the readings associated with the different components in respective data fields of an electronic form stored in the electronic form database 236. However, responsive to a negative verification result, in operations 318 and 320, the captured image of the vehicle dashboard may be identified as an exception and provided as feedback to further train and optimize the one or more machine learning models. In some example embodiments, operations 314-320 may be omitted without departing from a broader scope of the present disclosure. That is, in said example embodiments, the readings may be inputted to the electronic form without verification of the results. Further, the dashboard analysis operation ends in operation 324.

Turning to FIGS. 4 and 5, it is noted that these figures are substantially similar to FIG. 3 except for how the make and the model of the vehicle and/or the location of one or more components of the vehicle dashboard in the captured image are identified. In FIG. 4, the make and the model of the vehicle 102 and/or the location of one or more components of the vehicle dashboard in the captured image are identified using machine learning models, e.g., the vehicle type model and/or the location model. In one example, in operation 402, in addition to the odometer model, the digital gauge model, the analog gauge model, and the warning light model, the model generation engine 224 may generate a vehicle type model as described above in association with FIG. 7. Further, responsive to receiving the image of the vehicle dashboard 104, in operation 406, the vehicle type model may determine the make and model of the vehicle 102 based on the captured image of the vehicle dashboard 104. Then, in operation 408, the location of one or more components of the vehicle dashboard in the captured image is identified based on the make and model of the vehicle 102. Alternatively, in FIG. 5, the make and the model of the vehicle 102 may be determined based on a VIN number of the vehicle 102. The VIN number may either be inputted by the user 108 or obtained from an image of VIN plate. In either case, once the make and model of the vehicle 102 is determined, the image processing engine 226 may determine the location of one or more components of the vehicle dashboard in the captured image based on the make and model of the vehicle 102 by interaction with an external data source 550. Operations 304-306 and 310-322 of FIGS. 4 and 5 may be substantially similar to that of FIG. 3. Accordingly, said operations will be repeated herein for sake of brevity.

Figure 11:
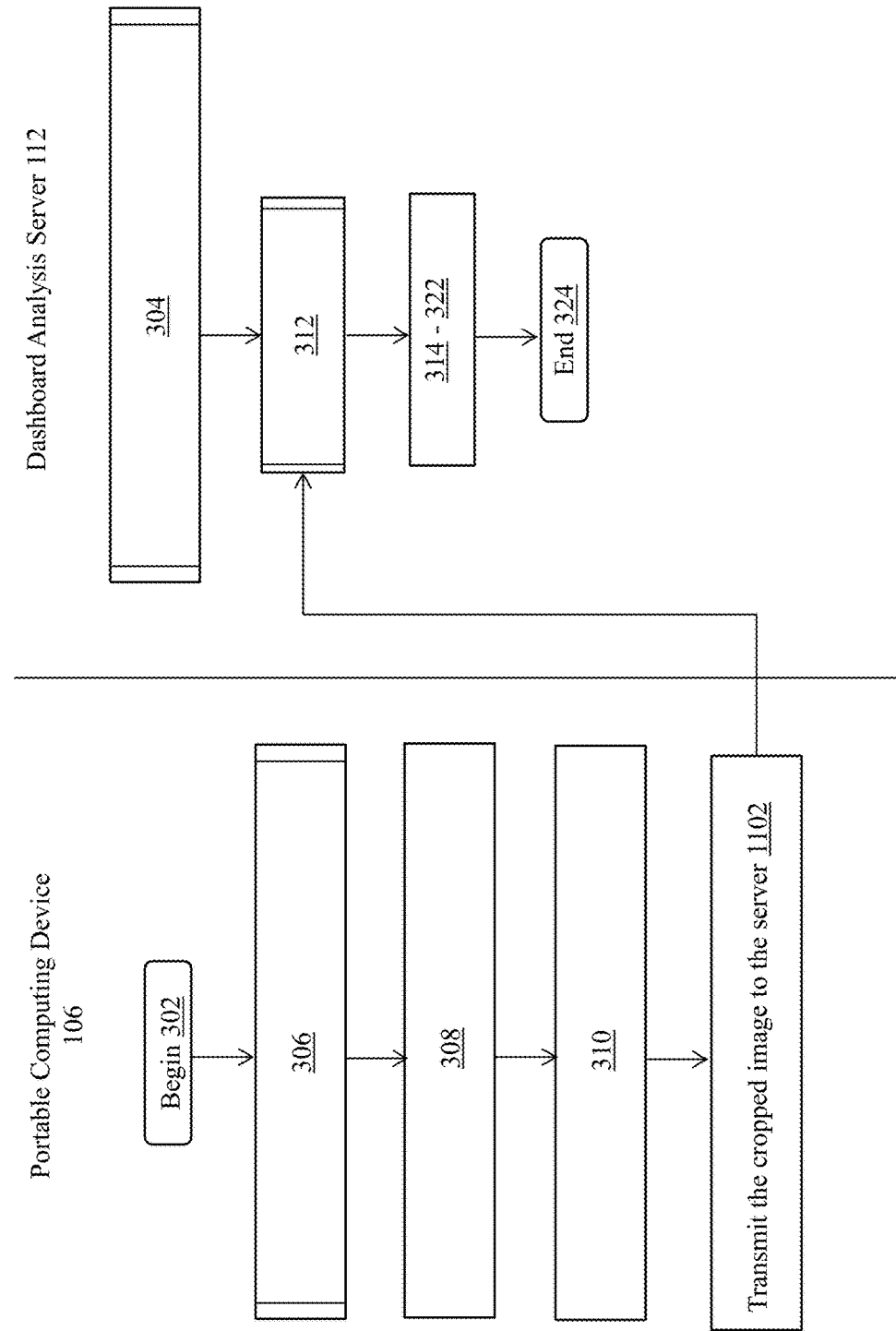
FIG. 11 illustrates an example dashboard analysis operation of the dashboard analysis system illustrated in FIG. 1B, in accordance with example embodiments of the present disclosure.

Turning to FIG. 11, this figure illustrates an example dashboard analysis operation of the dashboard analysis system illustrated in FIG. 1B, in accordance with example embodiments of the present disclosure. It is noted that FIG. 11 is substantially similar to FIG. 3 except that the dashboard analysis operations 302-310 are performed at the portable computing device 106 and the dashboard analysis operations 304 and 312-322 are performed at a server 112 that is remote from and communicably coupled to the portable computing device 106 via a network 110. Further, operations 302-324 of FIG. 11 have been described above in greater detail in association with FIG. 3 and will not be repeated herein for the sake of brevity. As illustrated in FIG. 11, once the cropped images of the one or more components have been generated, in operation 1102, the portable computing device 106 may transmit the cropped images to the server 112 over the network 110 using the wireless transceiver 204. In some example embodiments, the process of cropping the images of the components from the captured image of the vehicle dashboard 104 may also be performed at the server 112. In said example embodiments, instead of the cropped images, the portable computing device 106 may transmit the image of the vehicle dashboard 104 to the server 112. Further, in some example embodiments, one or more of the operations 314-322 may be performed at the portable computing device 106 without departing from a broader scope of the present disclosure.

Figure 12:
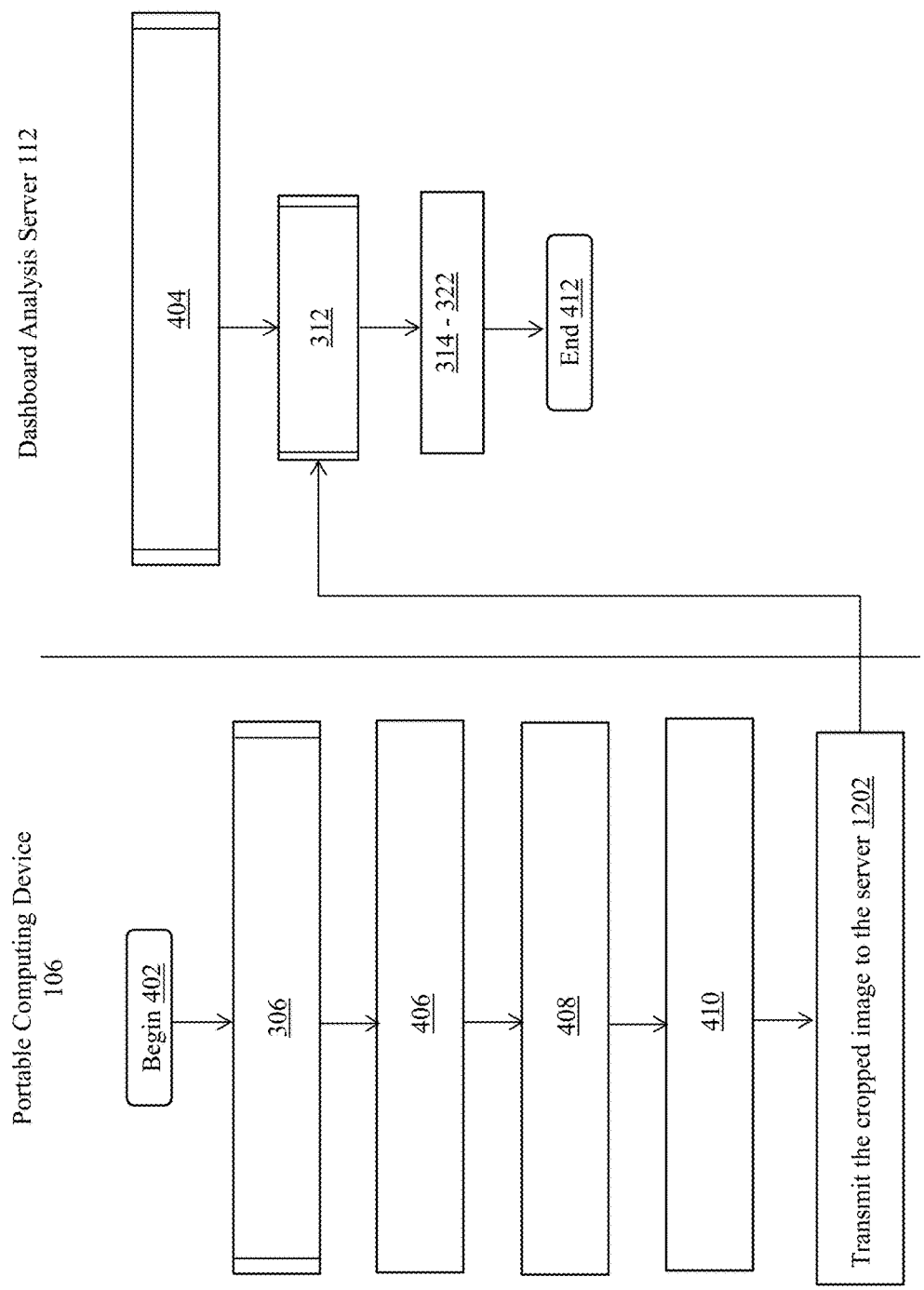
FIG. 12 illustrates another example dashboard analysis operation of the dashboard analysis system illustrated in FIG. 1B, in accordance with example embodiments of the present disclosure.

Turning to FIG. 12, this figure illustrates another example dashboard analysis operation of the dashboard analysis system illustrated in FIG. 1B, in accordance with example embodiments of the present disclosure. It is noted that FIG. 12 is substantially similar to FIG. 4 except that the dashboard analysis operations 402, 306, and 406-410 are performed at the portable computing device 106 and the dashboard analysis operations 404 and 312-322 are performed at a server 112 that is remote from and communicably coupled to the portable computing device 106 via a network 110. Further, operations 402-410, 306, and 312-322 of FIG. 12 have been described above in greater detail in association with FIGS. 3 and 4. Accordingly, said operations will not be repeated herein for the sake of brevity. As illustrated in FIG. 12, once the cropped images of the components have been generated, in operation 1202, the portable computing device 106 may transmit the cropped images to the server 112 over the network 110 using the wireless transceiver 204. In some example embodiments, the process of cropping the images of the components from the captured image of the vehicle dashboard 104 may also be performed at the server 112. In said example embodiments, instead of the cropped images, the portable computing device 106 may transmit the image of the vehicle dashboard 104 to the server 112. Further, in some example embodiments, one or more of the operations 314-322 may be performed at the portable computing device 106 without departing from a broader scope of the present disclosure.

FIG. 13 illustrates yet another example dashboard analysis operation of the dashboard analysis system illustrated in FIG. 1B, in accordance with example embodiments of the present disclosure. It is noted that FIG. 13 is substantially similar to FIG. 5 except that the dashboard analysis operations 502, 306, and 504-508 are performed at the portable computing device 106 and the dashboard analysis operations 304 and 312-322 are performed at a server 112 that is remote from and communicably coupled to the portable computing device 106 via a network 110. Further, operations 502-508, 304, 306, and 312-322 of FIG. 13 have been described above in greater detail in association with FIGS. 3 and 5. Accordingly, said operations will not be repeated herein for the sake of brevity. As illustrated in FIG. 13, once the cropped images of the components have been generated, in operation 1302, the portable computing device 106 may transmit the cropped images to the server 112 over the network 110 using the wireless transceiver 204. In some example embodiments, the process of cropping the images of the components from the captured image of the vehicle dashboard 104 may also be performed at the server 112. In said example embodiments, instead of the cropped images, the portable computing device 106 may transmit the image of the vehicle dashboard 104 to the server 112. Further, in some example embodiments, one or more of the operations 314-322 may be performed at the portable computing device 106 without departing from a broader scope of the present disclosure.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structures and methods may be embodied using transistors, logic gates, and electrical circuits (e.g., application specific integrated (ASIC) circuitry and/or in Digital Signal Processor (DSP) circuitry).

The terms "invention," "the invention," "this invention," and "the present invention," as used herein, intend to refer broadly to all disclosed subject matter and teaching, and recitations containing these terms should not be misconstrued as limiting the subject matter taught herein or to limit the meaning or scope of the claims. From the description of the exemplary embodiments, equivalents of the elements shown therein will suggest themselves to those skilled in the art, and ways of constructing other embodiments of the present invention will appear to practitioners of the art. Therefore, the scope of the present invention is to be limited only by the claims that follow.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A system comprising:
a portable computing device comprising one or more image capture devices, wherein the portable computing device is configured to:
generate one or more machine learning models that are configured to obtain a reading associated with at least one component of a vehicle dashboard of a vehicle from an image of the vehicle dashboard;
capture, using the one or more image capture devices, the image of the vehicle dashboard;
determine an approximate location of the at least one component of the vehicle dashboard in the captured image;
segment the captured image to obtain an image of the at least one component of the vehicle dashboard based on the approximate location of the at least one component in the captured image;
responsively, process, using the one or more machine learning models, the image of the at least one component to obtain the reading associated with the at least one component, the reading representative of data associated with the vehicle;
verify an accuracy of the reading associated with the at least one component that is obtained using the one or more machine learning models; and
responsive to a positive verification result, input the reading associated with the at least one component in a respective data field of an electronic form,
wherein responsive to a negative verification result, the portable computing device is configured to record the captured image as an exception and provide the captured image as feedback to the one or more machine learning models.

2. The system of claim 1, wherein the at least one component comprises one of a digital odometer, a warning light, an analog gauge, and a digital gauge.

3. The system of claim 1, wherein when the at least one component is a digital odometer, to process the image of the at least one component, the portable computing device is configured to:
determine if a unit of the reading associated with the digital odometer can be resolved from the captured image of the vehicle dashboard;
responsive to a negative determination, determine a location associated with the vehicle dashboard from a location metadata that is appended to the captured image of vehicle dashboard;
determine the unit associated with the reading of the digital odometer based on the location associated with the vehicle dashboard; and
responsive to a positive determination, input an image of the digital odometer that is segmented from the captured image of the vehicle dashboard to an odometer model to obtain the reading associated with the digital odometer, wherein the odometer model is one of the one or more machine learning models, and wherein the odometer model is configured to obtain the reading of the digital odometer from the image of the digital odometer.

4. The system of claim 1, wherein when the at least one component is an analog gauge, to process the image of the at least one component, the portable computing device is configured to:
input an image of the analog gauge that is segmented from the captured image of the vehicle dashboard to an analog gauge model,
wherein the analog gauge model is one of the one or more machine learning models, and wherein the analog gauge model is configured to determine a current position of an indicator of the analog gauge from the image of the analog gauge, wherein the indicator represents the reading of the analog gauge; and determine the reading of the analog gauge based on the current position of the indicator of the analog gauge and a position of a maximum or a minimum value of the analog gauge.

5. The system of claim 1, wherein when the at least one component is a digital gauge, to process the image of the at least one component to obtain the reading associated with the at least one component, the portable computing device is configured to:

input an image of the digital gauge that is segmented from the captured image of the vehicle dashboard to a digital gauge model, wherein the digital gauge model is one of the one or more machine learning models, and wherein the digital gauge model is configured to determine a current position of an indicator of the digital gauge from the image of the digital gauge, wherein the indicator represents the reading of the digital gauge; and determine the reading of the digital gauge based on the current position of the indicator of the digital gauge and a position of a maximum or a minimum value of the digital gauge.

6. The system of claim 1, wherein when the at least one component is a warning light, to process the image of the at least one component to obtain the reading associated with the at least one component, the portable computing device is configured to:

input an image of the warning light that is segmented from the captured image of the vehicle dashboard to a warning light model, wherein the warning light model is one of the one or more machine learning models, and wherein the warning light model is configured to determine that the warning light is switched on and a condition of the vehicle represented by the warning light; and responsive to a positive determination that the warning light is switched on in the image of warning light:

determine the condition of the vehicle represented by the warning light; and generate and present an alert indicating the status of the warning light and the condition of the vehicle represented by the warning light.

7. The system of claim 1, wherein the approximate location of the at least one component of the vehicle dashboard in the captured image is determined based on a make and a model of the vehicle.

8. The system of claim 1, wherein the approximate location of the at least one component of the vehicle dashboard in the captured image is determined based on a user input.

9. The system of claim 7, wherein the make and the model of the vehicle is determined based on one of a user input and a vehicle identification number of the vehicle associated with the vehicle dashboard.

10. The system of claim 7, wherein the make and the model of the vehicle is determined using a vehicle type model of the one or more machine learning models that is configured to determine the make and the model of the vehicle based on the captured image of the vehicle dashboard.

11. A system comprising:

a portable computing device comprising one or more image capture devices, wherein the portable computing device is configured to:

capture, using the one or more image capture devices, an image of a vehicle dashboard of a vehicle;

determine an approximate location of an odometer, a digital gauge, an analog gauge, and a warning light of the vehicle dashboard in the captured image;

segment the captured image to obtain an image of the each of the odometer, the digital gauge, the analog gauge, and the warning light based on the approximate location of the odometer, the digital gauge, the analog gauge, and the warning light in the captured image;

responsively, process, using a first machine learning model, the image of the odometer to determine a reading associated with the odometer, process, using a second machine learning model, the image of the analog gauge to determine a reading associated with the analog gauge, process, using a third machine learning model, the image of the digital gauge to determine a reading associated with the digital gauge, and process, using a fourth machine learning model, the image of the warning light to determine a condition of the vehicle represented by the warning light;

verify an accuracy of the reading associated with the odometer, the reading associated with the digital gauge, the reading associated with the analog gauge, and the condition of the vehicle represented by the warning light; and responsive to a positive verification result, input the readings in respective data fields of an electronic form, wherein responsive to a negative verification result, record the captured image of the vehicle dashboard as an exception and provide the captured image as feedback to the first, second, third, and/or fourth machine learning model.

12. The system of claim 11:

wherein the first machine learning model is an odometer model that is trained to identify a reading associated with a digital odometer from an image of the digital odometer; and wherein to process, using the first machine learning model, the image of the odometer, the portable computing device is configured to:

determine that the odometer is the digital odometer based on a make and a model of the vehicle;

responsive to a positive determination, input the image of the odometer to the odometer model;

determine, using the odometer model, each digit representing the reading associated with the odometer; and output the reading of the odometer; and determine a unit of the reading associated with the odometer based on one of the image of the odometer and location of the vehicle obtained from a location metadata appended to the captured image of the vehicle dashboard.

13. The system of claim 11:

wherein the second machine learning model is an analog gauge model that is trained to identify the reading associated with the analog gauge from the image of the analog gauge; and wherein to process, using the second machine learning model, the image of the analog gauge, the portable computing device is configured to:

input the image of the analog gauge to the analog gauge model;

determine, using the analog gauge model, a position of an indicator of the analog gauge in the image of the analog gauge; and determine the reading of the analog gauge based on the position of the indicator of the analog gauge and a position of a maximum or minimum value of the analog gauge.

14. The system of claim 11:

wherein the third machine learning model is a digital gauge model that is trained to identify the reading associated with the digital gauge from the image of the digital gauge; and wherein to process, using the third machine learning model, the image of the digital gauge, the portable computing device is configured to:

input the image of the digital gauge to the digital gauge model;

determine, using the digital gauge model, a position of an indicator of the digital gauge in the image of the digital gauge; and determine the reading of the digital gauge based on the position of the indicator of the digital gauge and a position of a maximum or minimum value of the digital gauge.

15. The system of claim 11:

wherein the fourth machine learning model is a warning light model that is trained to identify that the warning light is switched on and to identify the condition of the vehicle represented by the warning light from the image of the warning light; and wherein to process, using the fourth machine learning model, the image of the warning light, the portable computing device is configured to:

input the image of the warning light to the warning light model;

determine, using the warning light model, that the warning light in the image of the warning light is switched on; and responsively, determine the condition of the vehicle represented by the warning light, and generate an alert message indicating the status of the warning light.

16. A system comprising:

a portable computing device comprising at least one or more image capture devices and a wireless transceiver, wherein the portable computing device is configured to:

capture, using the one or more image capture devices, an image of a vehicle dashboard of a vehicle;

determine an approximate location of at least one component of the vehicle dashboard in the captured image;

segment the captured image to obtain an image of the at least one component of the vehicle dashboard based on the approximate location of the at least one component in the captured image; and transmit, by the wireless transceiver, the image of the at least one component to a server;

the server that is communicably coupled to the portable computing device and configured to:

generate one or more machine learning models that are configured to obtain a reading associated with the at least one component of the vehicle dashboard from the image of the vehicle dashboard;

responsive to receiving the image of the at least one component, process, using the one or more machine learning models, the image of the at least one component to obtain the reading associated with the at least one component, the reading representative of data associated with the vehicle; and transmit the reading associated with the at least one component to the portable computing device to verify an accuracy of the reading associated with the at least one component and input the reading associated with the at least one component in a respective data field of an electronic form responsive to a positive verification result.

17. The system of claim 16, wherein the at least one component comprises one of a digital odometer, a warning light, an analog gauge, and a digital gauge.

* * * * *